United States Patent
Oberhofer et al.

(10) Patent No.: US 11,449,476 B2
(45) Date of Patent: Sep. 20, 2022

(54) EXTRACTING DATA FROM A BLOCKCHAIN NETWORK

(71) Applicant: INTERNATIONAL BUSINESS MACHINES CORPORATION, Armonk, NY (US)

(72) Inventors: Martin Oberhofer, Sindelfingen (DE); Florian Mentzel, Dortmund (DE); Hien Pham The, Schönaich (DE); Thishanth Thevarajah, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 16/829,535

(22) Filed: Mar. 25, 2020

(65) Prior Publication Data
US 2020/0341951 A1    Oct. 29, 2020

(30) Foreign Application Priority Data
Apr. 24, 2019 (EP) .................................. 19170763

(51) Int. Cl.
*G06F 16/00* (2019.01)
*G06F 16/21* (2019.01)
(Continued)

(52) U.S. Cl.
CPC .......... *G06F 16/212* (2019.01); *G06F 16/254* (2019.01); *G06F 16/28* (2019.01); *H04L 63/0428* (2013.01); *G06Q 2220/00* (2013.01)

(58) Field of Classification Search
CPC ....... G06F 16/28; G06F 16/212; G06F 16/254
See application file for complete search history.

(56) References Cited

U.S. PATENT DOCUMENTS

2005/0262192 A1    11/2005 Mamou et al.
2017/0092060 A1    3/2017 Toohey et al.
(Continued)

FOREIGN PATENT DOCUMENTS

AU    2020261982 A1    9/2021
CA    3137242 A1    10/2020
(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.
(Continued)

*Primary Examiner* — Cheryl Lewis
(74) *Attorney, Agent, or Firm* — Robert D. Bean

(57) ABSTRACT

The invention relates to a method for a model-driven extraction of event data representing an event occurring on a blockchain network by a computational device with access to the blockchain network. The computational device is configured as an ETL-device for executing an ETL-code to modify a data content of an external data structure external of the blockchain network using the extracted event data. The method comprising detecting the event, determining an event schema, providing and executing a the ETL-code. The ETL-code comprises machine-executable instructions for extracting the event data representing the detected event, transforming the extracted event data using the event schema to comply with a data model defining a logical structure of the external data structure and loading the transformed data to the external data structure to modify the data content of the external data structure.

25 Claims, 9 Drawing Sheets

(51) Int. Cl.
  *G06F 16/28* (2019.01)
  *G06F 16/25* (2019.01)
  *H04L 9/40* (2022.01)

(56) References Cited

U.S. PATENT DOCUMENTS

| | | | |
|---|---|---|---|
| 2017/0132300 A1 | 5/2017 | Sekar | |
| 2018/0268151 A1 | 9/2018 | Cuomo et al. | |
| 2018/0308072 A1 | 10/2018 | Smith et al. | |
| 2019/0042620 A1 | 2/2019 | Garagiola et al. | |
| 2019/0050431 A1 | 2/2019 | Callan et al. | |
| 2019/0066228 A1 | 2/2019 | Wright | |
| 2019/0253434 A1* | 8/2019 | Biyani | H04L 9/3226 |
| 2021/0211468 A1* | 7/2021 | Griffin | G06Q 20/383 |
| 2021/0367764 A1* | 11/2021 | Mercuri | G06Q 20/308 |

FOREIGN PATENT DOCUMENTS

| | | |
|---|---|---|
| CN | 113711536 A | 11/2021 |
| EP | 3959842 A1 | 3/2022 |
| KR | 20210133289 A | 11/2021 |
| SG | 11202109836 A | 10/2021 |
| WO | 2019014592 A1 | 1/2019 |
| WO | 2019023386 A1 | 1/2019 |
| WO | 2020216536 A1 | 10/2020 |

OTHER PUBLICATIONS

Zyskind et al., "Decentralizing Privacy: Using Blockchain to Protect Personal Data", 2015 IEEE CS Security and Privacy Workshops, pp. 180-184.

Riegger et al., Efficient Data and Indexing Structure for Blockchains in Enterprise Systems (Extended Abstract), Oct. 10, 2018, ICPS Proceedings, iiWAS2018, pp. 1-20.

Github, "Blockchain-etl / Ethereum-etl", Python scripts for ETL, printed Nov. 14, 2019, 12 pages, https://github.com/blockchain-etl/ethereu m-etl.

Github, "Analyseether / ether_sql", printed Nov. 14, 2019, 2 pages, https://github.com/analyseether/ether_sql.

Github, "DAppBoard / dappboard-etl", printed Nov. 14, 2019, 2 pages, https://github.com/DAppBoard/dappboard-etl.

Hyperledger, "Type: Distributed ledger software", Copyright © 2020 The Linux Foundation®, 5 pages, https://www.hyperledger.org/projects/fabric.

Github, "Blockchain-etl / bitcoin-etl", printed Nov. 14, 2019, 7 pages, https://github.com/blockchain-etl/bitcoin-etl.

Dillenberger et al., "Blockchain analytics and artificial intelligence", IBM J. Res. & Dev., vol. 63, No. 2/3, Mar. 1, 2019, p. 5:1-5:14.

Novotny et al., "Permissioned Blockchain Technologies for Academic Publishing", Arxiv.org, Cornell University Library, Sep. 23, 2018, 14 pages.

International Search Report, International Application No. PCT/EP2020/057574, International Filing Date: Mar. 19, 2020, Date of mailing of the International Search Report: dated Jun. 18, 2020, 4 pages.

Oberhofer, et al., "Extracting Data From a Blockchain Network," Application and Drawings, Filed on Apr. 24, 2019, 72 Pages, Related U.S. Appl. No. 19170763.7.

Oberhofer, et al., "Extracting Data From a Blockchain Network," Application and Drawings, Filed on Mar. 19, 2020, 57 Pages, Related U.S. Appl. No. 2021-561869.

Oberhofer, et al., "Extracting Data From a Blockchain Network," Application and Drawings, Filed on Mar. 19, 2020, 70 Pages, Related U.S. Appl. No. 2020261982.

Oberhofer, et al., "Extracting Data From a Blockchain Network," Application and Drawings, Filed on Mar. 19, 2020, 70 Pages, Related U.S. Appl. No. 287252.

Oberhofer, et al., "Extracting Data From a Blockchain Network," Application and Drawings, Filed on Mar. 19, 2020, 71 Pages, Related U.S. Appl. No. 202147047451.

Oberhofer, et al., "Extracting Data From a Blockchain Network," Application and Drawings, Filed on Mar. 19, 2020, 87 Pages, Related U.S. Appl. No. 2021126894.

\* cited by examiner

EXTRACTING DATA FROM A BLOCKCHAIN NETWORK

BACKGROUND

The present disclosure relates to the field of electronic data processing and, more specifically, to extracting data from a blockchain network.

A blockchain provides a shared ledger technology that participants in a blockchain network may use to record transactions that cannot be altered. A blockchain provides a single point of truth: a shared, tamper-evident and/or tamper-proof ledger. This approach changes transaction tracking from a siloed model, where multiple ledgers are maintained separately, to one that provides a common view across the blockchain network. Because blockchain uses consensus to commit transactions to the ledger the results become eventually consistent. Even a system administrator cannot delete a transaction. Each member of the blockchain network, which has access privileges, has a copy of the same ledger, so asset provenance and traceability are transparent and trusted. Information may be shared only on a need-to-know basis.

SUMMARY

Various embodiments provide a method for a model-driven extraction of event data representing an event occurring on a blockchain network by a computational device with access to the blockchain network as well as a computer program product and a computational device for executing the method as described by the subject matter of the independent claims. Advantageous embodiments are described in the dependent claims. Embodiments of the present invention can be freely combined with each other if they are not mutually exclusive.

In one aspect, the invention relates to a method for a model-driven extraction of event data representing an event occurring on a blockchain network by a computational device with access to the blockchain network. The computational device is configured as an ETL-device for executing an ETL-code to modify a data content of an external data structure external of the blockchain network using the extracted event data.

The method comprises detecting the event occurring on the blockchain network. An event schema for the detected event is determined, wherein the event schema identifies a logical structure of the event data representing the detected event. The ETL-code is provided. The ETL-code comprises a set of machine-executable instructions configured for extracting the event data representing the detected event, transforming the extracted event data using the event schema to comply with a data model defining a logical structure of the external data structure and loading the transformed data to the external data structure to modify the data content of the external data structure. The provided ETL-code is executed. The execution of the ETL-code causes the ETL-device to extract the event data representing the detected event, transform the extracted event data using the event schema to comply with the data model of the external data structure, and load the transformed event data to the external data structure to modify the data content of the external data structure.

According to embodiments, the ETL-device is comprising the blockchain network in form of an ETL-peer.

According to embodiments, the ETL-device is an external computational device configured to monitor data exchanged on the blockchain network using a cryptographically secured messaging connection to a peer of the blockchain network.

In a further aspect, the invention relates to a computer program product comprising a non-volatile computer-readable storage medium having computer-readable program code embodied therewith for a model-driven extraction of event data representing an event occurring on a blockchain network by a computational device with access to the blockchain network. The computational device is configured as an ETL-device for executing an ETL-code to modify a data content of an external data structure external of the blockchain network using the extracted event data.

An execution of the program code by a processor of the ETL-device causes the processor to control the ETL-device to detect the event occurring on the blockchain network. An event schema for the detected event is determined, wherein the event schema identifies a logical structure of the event data representing the detected event. The ETL-code is provided. The ETL-code comprises a set of machine-executable instructions configured for extracting the event data representing the detected event, transforming the extracted event data using the event schema to comply with a data model defining a logical structure of the external data structure and loading the transformed data to the external data structure to modify the data content of the external data structure. The provided ETL-code is executed. The execution of the ETL-code causes the ETL-device to extract the event data representing the detected event, transform the extracted event data using the event schema to comply with the data model of the external data structure, and load the transformed event data to the external data structure to modifying the data content of the external data structure.

In a further aspect, the invention relates to a computational device with access to a blockchain network for a model-driven extraction of event data representing an event occurring on the blockchain network. The computational device is configured as an ETL-device for executing an ETL-code to modify a data content of an external data structure external of the blockchain network using the extracted event data.

The ETL-device comprises a processor and a memory storing machine-executable program instructions. Executing the program instructions by the processor causes the processor to control the ETL-device to detect the event occurring on the blockchain network. An event schema for the detected event is determined, wherein the event schema identifies a logical structure of the event data representing the detected event. The ETL-code is provided. The ETL-code comprises a set of machine-executable instructions configured for extracting the event data representing the detected event, transforming the extracted event data using the event schema to comply with a data model defining a logical structure of the external data structure and loading the transformed data to the external data structure to modify the data content of the external data structure. The provided ETL-code is executed. The execution of the ETL-code causes the ETL-device to extract the event data representing the detected event, transform the extracted event data using the event schema to comply with the data model of the external data structure, and load the transformed event data to the external data structure to modify the data content of the external data structure.

According to embodiments, the ETL-device is comprising the blockchain network in form of an ETL-peer.

According to embodiments, the ETL-device is an external computational device configured to monitor data exchanged on the blockchain network using a cryptographically secured messaging connection to a peer of the blockchain network.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Figure 1:
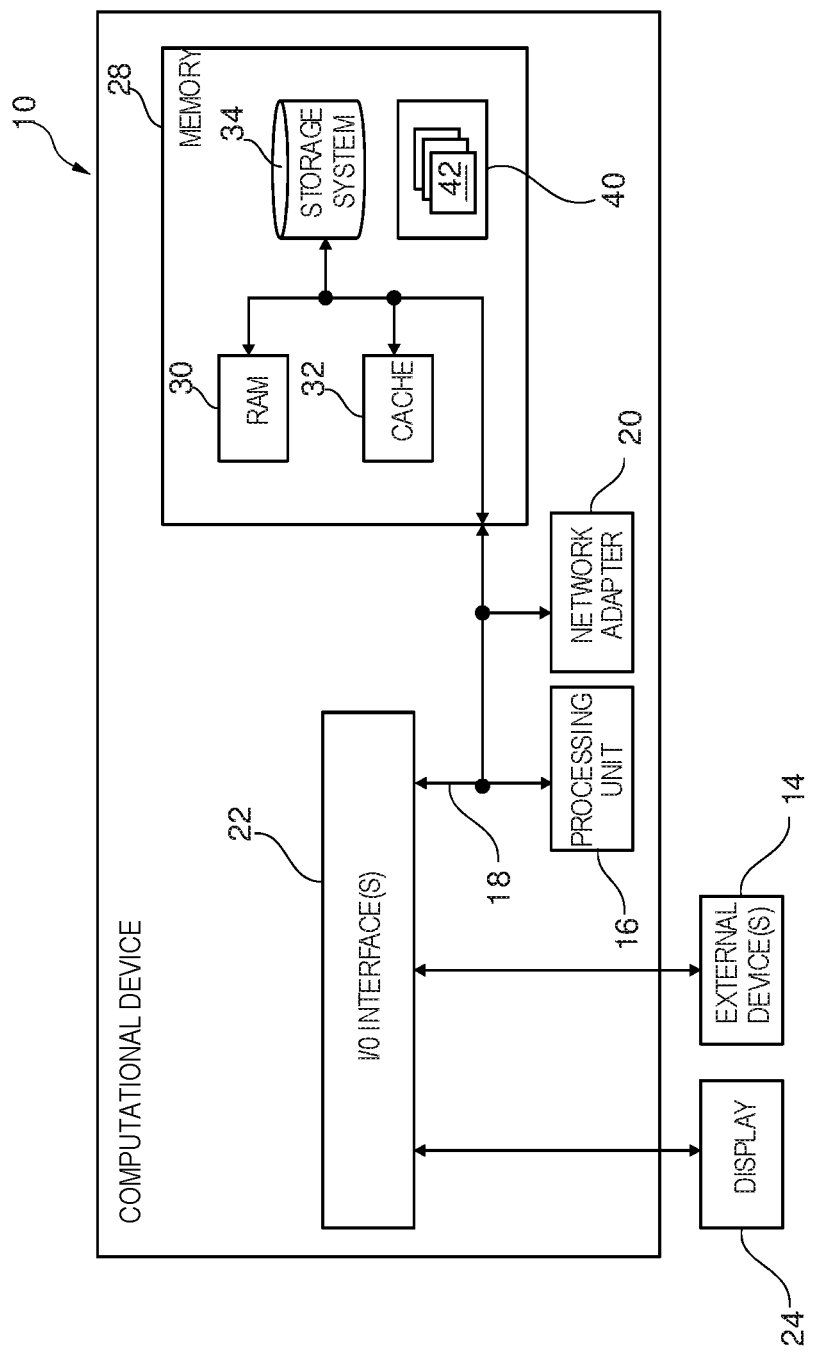
FIG. 1 depicts a schematic diagram illustrating an exemplary computational device according to an embodiment.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect of providing a straightforward mechanism to extract data from a blockchain. No additional connectors may need to be implemented to extract the data. Many valuable pieces of information may be extractable from the blockchain data, e.g., by performing an analysis of the respective data. In order to be able to perform such an analysis, the data may be extracted and provided to an external data structure outside the blockchain network configured for the analysis.

An event may comprise providing additional data, modifying existing data and/or deleting existing data. The event may be provided by invoking a transaction in a block of the blockchain recording the respective event. According to embodiments, events may comprise or trigger a data query. For example, a callback on delete may be necessary in case of a data delete being detected as an event in order to determine which data is to delete in order to execute the data delete. In the following a blockchain may also be referred to as a ledger. According to embodiments a ledger may be identical with the blockchain. According to alternative embodiments, a ledger may in addition to a blockchain comprise further data, e.g., a world state or private data, stored in further data collections.

A blockchain may be used as a ledger to store any type of information. Although, primarily used for financial transactions, the blockchain may store any type of information including assets, i.e., products, packages, services, status, etc. The blockchain may be used to securely store any type of information in its immutable ledger. Decentralized consensus is different from the traditional centralized consensus, such as when one central database used to rule transaction validity. A decentralized consensus scheme transfers authority and trusts to a decentralized network and enables its nodes to continuously and sequentially record their transactions on a block, creating a unique chain referred to as the blockchain. Thus, a need for a central intermediary may be removed by the decentralized consensus scheme using cryptography, e.g., via hash codes, to secure the authentication of the transaction source.

Since blockchain may be implemented as a permissioned distributed data system, designed with strict privacy and security control its current persistency implementation is not suitable for on-chain analytics, which means running sophisticated analytics like machine learning, predictive analytics and similar on the blockchain technology itself. On top of that, many analytics require data from different sources in a single system, for example a data lake based on Hadoop or an enterprise data warehouse which get typically inputs from multiple other systems for analytics. In such a scenario, a blockchain system would be just another transactional system like an order entry system which needs to provide its transactional data to such a central analytics system. In a permissioned blockchain network all users and components may have known identities. A sign/verify logic is implemented at every communication touchpoint and transactions may be consented upon through a series of endorsement and validation checks.

A peer is a network entity that maintains a ledger and runs chaincode in order to perform read/write operations to the ledger. Peers are owned and maintained by members of the blockchain network.

The blockchain may for example be a blockchain provided by the Hyperledger Fabric blockchain project. The Hyperledger Fabric is a blockchain framework implementation under the umbrella of the Linux Foundation. It provides a foundation for developing applications or solutions with a modular architecture allowing components, such as consensus and membership services, to be plug-and-play. For example, smart contracts, also referred to as chaincode, may be provided comprising application logic of the system.

Hyperledger Fabric may be used as private ledger between entities, e.g., business partners, sharing initial trust and a wish for identification, e.g., for business purposes. Therefore, a blockchain on the Hyperledger Fabric may be provided in form a private blockchain which is permissioned, i.e., for being granted access to the blockchain a registration comprising an authorization by a participating entity is required, exhibits user IDs used for identifying and authorizing the participating entities and implements consensus without exhaustive mining like public blockchains that lack an initial trust between participating anonymous entities.

As a platform for permissioned blockchain networks, Hyperledger Fabric comprises a modular certificate authority component for managing blockchain networks identities assigned to all members of blockchain network. Thus, a control over network activities based on access control lists (ACLs) is enabled guaranteeing that every transaction is traceable to a registered member of the blockchain network. The certificate authority may hold a root certificate to sign enrollment certificates for each member being authorized to join the blockchain network with that root certificate. The trust is created by the belief in the protection of the integrity of that root certificate. Derived certificates may be renewed or revoked. Furthermore, enrollment certificate may be issued to each member component, server-side applications and occasionally users. Each enrolled user may further be granted an allocation of transaction certificates. Each transaction certificate may authorize one network transaction. The certificate-based control over network membership and actions may enable members to restrict access to private and confidential channels, applications, and data.

Hyperledger Fabric comprises a membership service provider (MSP) component offering an abstraction of all cryptographic mechanisms and protocols behind issuing and validating certificates as well as user authentication. The membership service provider may be installed on each peer to ensure that transaction requests that are issued to the respective peer originate from an authenticated and authorized user identity. The Hyperledger Fabric further provides an ordering service implemented by ordering nodes, also referred to as orderers. Ordering nodes order the transactions and package the ordered transactions into blocks that are sent to the peers to be written to their instances of the ledger.

Hyperledger Fabric implements multiple checkpoints ensuring data consistency and integrity throughout the transaction flow, comprising client authentication, endorsement, ordering, and commitment to the ledger. On a Hyperledger Fabric blockchain network, a flow of data for queries and transactions is initiated by a client-side application by submitting a transaction request to a peer on a blockchain channel. Using APIs, a client application signs and submits a transaction proposal to appropriate endorsing peers on a specified blockchain channel. This initial transaction proposal is a request for endorsement. Each peer on the respective blockchain channel verifies the identity and authority of the submitting client. If valid, the respective peers run the specified chaincode against the inputs provided by the client. Based on the transaction results and the endorsement policy for the invoked chaincode, each peer returns a signed response to the application. Each signed response agreeing to the transaction is an endorsement of the transaction. If the proposal called a query function in the chaincode, the application returns the data to the client. If the proposal called a function in the chaincode to update the ledger, the application continues with the following steps: The application forwards the transaction, which includes the read/write set and endorsements, to the ordering service. All peers on the blockchain channel used validate each transaction in the block by applying the chaincode-specific validation policy and running a concurrency control version check. Each peer on a channel validates ordered blocks of transactions and then commits, i.e., appends, the blocks to its local replica of the channel ledger. Peers also mark each transaction in each block as valid or invalid. Any transaction that fails the validation process is marked as invalid in the block. All valid transactions are used to update the state database, i.e., the world state, accordingly with the modified key/value pairs. The gossip data dissemination protocol is used to continually broadcast ledger data across the blockchain channel to ensure synchronized ledgers among peers assigned to the respective blockchain channel.

Embodiments may have the beneficial effect of allowing for more than just a simple listening to events on the ledger. In case an additional block comprising event data representing an event is added to the blockchain, the additional block is not just forwarded to an external listener, but rather an ETL-code is executed by an ETL-device provided in form of an ETL-peer which is part of the blockchain network to extract, transform and load the event data from the blockchain such that the resulting set of data used for modifying the external data structure complies with the data model of the external data structure. Since the ETL-code is executed by an ETL-peer within the blockchain network, privacy may be preserved as well as registration requirements met. Furthermore, using a suitable ETL-Code which is adapted to the event schema match by the event data as well as data model of the external data structure may ensure that all relevant data elements are extracted and taken into account for modifying the external data structure.

Embodiments may have the beneficial effect that the ETL-peer is part of the blockchain network, i.e., the ETL-code is executed within the security perimeter of the blockchain network. The ETL-peer as part of the security perimeter of the blockchain network may thus be provided with full access to all event data handled the blockchain network. In particular, the ETL-peer may thus be enabled to listening to the full communication within the blockchain network, e.g., the full communication protocol of the blockchain network used for routing data within the blockchain network. The communication protocol of the blockchain network may, e.g., be provided in form of a gossip protocol, i.e., a gossip data dissemination. The gossip protocol provides a reliable and scalable data dissemination protocol to ensure data integrity and consistency. In order to increase blockchain network performance, security, and scalability, workload may be divided across transaction execution peers, like endorsing and committing peers, on the one hand and transaction ordering nodes on the other hand.

Messaging according to the gossip protocol may be continuous with each peer on a blockchain channel constantly receiving current and consistent ledger data from multiple peers. Each gossiped message may be signed. The gossip protocol may manage peer discovery and blockchain channel membership. For this purpose, the gossip protocol may continually identify available peers and detect peers that have gone offline. The gossip protocol may disseminate ledger data across all peers of a blockchain channel. Any peer being out of sync with the rest of the peer of a blockchain channel, i.e., missing ledger data, e.g., due to delays, network partitions, or other causes, may eventually be synced up to the current ledger state by contacting peers in possession of the missing data. Newly connected peers may be brought up to speed by allowing peer-to-peer state transfer update of ledger data.

A broadcasting based on the gossip protocol may comprise receiving messages by peers from other peers of the same channel and forwarding the received messages to a number of randomly selected peers on the respective channel. Peers may further exercise a pull mechanism rather than waiting for a delivery of a message. Repeating this cycle may keep channel membership, ledger and state information continually current and in sync. For dissemination of additional blocks of the blockchain, a leader peer on the channel may pull the data from an ordering service, which orders transactions and packages the same into blocks, and initiate a dissemination of the blocks using the gossip protocol to other peers assigned to the same member of the blockchain network. The blocks may be signed by the ordering service and delivered to leader peers on a blockchain channel. Each member of the blockchain network may comprise one peer elected as leader peer which may maintain connection with the ordering service and initiate distribution of additional blocks of the blockchain across the other peers of the respective member.

Online peers of the blockchain network may indicate their availability continually broadcasting alive messages. Each of these messages may, e.g., comprise a public key infrastructure (PKI) ID as well as a signature of the sender over the message. If no peer of a blockchain channel receives an alive message from a specific peer, the respective peer may be considered as being dead and eventually purged from broadcast channel membership. Since the alive messages are cryptographically signed, malicious peers are prevented from impersonating other peers, as they are lacking a signing key authorized by a root certificate authority (CA).

In addition to the automatic forwarding of received messages, a state reconciliation process may synchronize a world state across peers on each blockchain channel. Since no fixed connectivity is required to maintain data dissemination based on the gossip protocol, process reliably may provide data consistency and integrity to the shared ledger including tolerance for node crashes.

Since blockchain channels are segregated, peers on one channel may not be able to message or share information on any other channel. A peer may belong to multiple channels, however partitioned messaging may prevent data from being disseminated to peers that are not assigned to the same blockchain channel by applying message routing policies based on blockchain channel subscriptions of the peers.

Security of point-to-point messages may, e.g., be handled by TLS layers of the peers without require signatures. Peers may be authenticated by their certificates assigned by a CA. Peer certificates may be authenticated according to the gossip protocol. Authentication may be governed by a membership service provider of the blockchain network. When the peer connects to a blockchain channel for the first time, the TLS session may bind with a membership identity. Thereby, each peer may essentially be authenticated to the connecting peer with respect to membership in the blockchain network and blockchain channel.

The full communication between peers of the blockchain network may exceed the data content of the blocks comprising the blockchain. Data handled by the blockchain network may be stored using a ledger. A ledger stores factual information about objects. The factual information may comprise facts about current states of the objects, e.g., values of attributes of the objects, as well as a history of transactions resulting in the respective states. In addition to the blockchain, the ledger may comprise a world state. Thus, the data comprising the ledger and handled by the blockchain network may exceed the data comprising the blockchain. The blockchain and the world state each represents a set of factual information about a set of objects. A world state may be provided in form of a data collection, e.g., a database, comprising a cache of the current states of the set of objects. The set of current states of objects comprising the world state of the ledger may also be referred to as ledger states. A world state may have the beneficial effect of providing direct access the current states rather than having to calculate them by traversing the entire transaction log resulting in the respective current states, which is provided by the blockchain. Ledger states may, e.g., be expressed as key-value pairs. The world state may change frequently, as ledger states are created, updated and/or deleted. The blockchain provides a transaction log recording all the changes that have resulted in the current world state using a block structure. Transactions are collected inside blocks that are appended to the blockchain. In contrast to the world state, the blockchain cannot be modified once written, i.e., it is designed to be immutable.

The ETL-peer as part of the blockchain network is registered and has been authorized to access the blockchain. Thus, the blockchain owner/owners know, that there is an ETL-peer accessing the data. The ETL-peer may be checked in advanced and its access rights for accessing data on the blockchain may be defined as appropriate. At runtime, authentication credentials and/or digital certificates may be checked for validity to ensure that only entities, like the ETL-peer, with valid access rights proven with valid authentication credentials and/or digital certificates are allowed to read the data. Thus, misuse may be prevented.

Known public blockchains are mostly currency centered, i.e., they are focused on two kinds of transactions: receiving and sending money like a bank account. These transactions may, e.g., be based on selling and buying, i.e., receiving money or spending money for a product and/or services provided. This means, that one of the main goals of public blockchains is trading of (virtual) money, also referred to as cryptocurrency. This can be understood as a result of the consensus mechanism implemented in public blockchains. To achieve agreements, i.e., consensus, on the order and correctness of transactions, a computational exhaustive process is implemented for verifying transactions recorded in the blockchain. The computational exhaustive process, e.g., comprises solving a numerical puzzle, like finding a hash value satisfying one or more predefined criteria for a block with transactions to be added to the blockchain. Since hash values are not predictable, i.e., already a small change to the block changes the resulting hash value so extensively that it appears uncorrelated with a hash value resulting without the small change, variations of the input data have to be systematically tested until a hash value satisfying the predefined criteria is found by chance. A proof of a solution to the numerical puzzle serves as proof that the block is genuine. For manipulating a block, all the computational efforts made for generating the respective block as well as all the following blocks in the blockchain have to be repeated. In case enough peers are interested in the truth, this is assumed to either be impossible or at least economically highly unfavorable. In order for peers to invest the computational power to implement the proofs some reward is necessary, as the peers or at least some of them may not necessarily have an inherent interest in the truth, i.e., trust has to be established among untrusted parties. The reward provided in public blockchains is, e.g., a certain amount of cryptocurrency. Considering private blockchain, such a reward is not necessary because the participating entities, e.g., companies, have an inherent interest in truth. For example, only trusted parties may be granted access to the blockchain. Therefore, cryptocurrency is not necessary part of private blockchains.

Embodiments may have the beneficial effect of being suitable to handle multiple different types of transactions made over a blockchain, e.g., a private blockchain. Thus, the data extraction is not limited to a single type of transaction as typically implemented in public blockchain. Varying logical structures of event data may be handled. Considering cryptocurrencies, the information comprising the blockchain may be simply structured and the schema of incoming information may thus be known in advance. However, this is not the case for private blockchains like Hyperledger Fabric. Any type of event data may be recorded without any requirements in terms of data structure being enforced.

Data extraction in case of such a multi-purpose use may turn out to be rather difficult: every application and every datatype may have to be handled separately, rendering an enterprise solution obsolete, as it would need to be individually customized for each end-user.

Embodiments may have the beneficial effect of using a model-driven extraction of data. Event schemas for identifying a logical structure of the event data and mapping the identified structural elements are determined automatically, e.g., using a library providing a plurality of event schemas. Furthermore, a multi-purpose transformation is applied, that may easily be adjusted to new use cases, e.g., by a datasteward or using machine learning. Thus, a necessity of changing source code may be avoided, proposing a large benefit for data focused applications. A communication protocol of the blockchain network, e.g., the gossip protocol, may be used for synchronizing the peers within the blockchain network.

The model-driven extraction of data may be plugged into any blockchain network using an ETL-peer integrated into the blockchain network. The ETL-peer as a listener is thus part of the network itself, allowing it to listen to the full communication protocol of the blockchain network, enabling the ETL-peer to take into account all relevant data, even data stored in private data collections, i.e., a data collection comprising data not being part of the blockchain and shared only by a limited number of selected members of the blockchain network.

A blockchain channel refers to a private subnet of communication between two or more selected members of a blockchain network. Such blockchain channel may be used for the purpose of conducting private and confidential transactions. A blockchain channel may be defined by one or more of the following: the members of the blockchain network, e.g., organizations, selected to take part in the private subnet of communication, the anchor peers per member, the shared ledger, chaincode application(s), and ordering service node(s). Each transaction on the blockchain network may be executed on a blockchain channel, where each party taking part in the transaction has to be authenticated and authorized to transact on that specific blockchain channel. Each peer joining a blockchain channel, i.e., being registered and authorized for using the respective blockchain channel, may have its own identity, e.g., assigned by a membership services provider, which authenticates the respective peer to the channel.

Although an anchor peer may be assigned multiple channels maintaining multiple ledgers, no ledger data may pass from one channel to another. Such a separation of ledgers by blockchain channels may be defined and implemented using configuration chaincode, an identity membership service and a gossip protocol. Dissemination of data including information on transactions, ledger state and channel membership on the blockchain network may be restricted to peers with verifiable membership to a certain blockchain channel. Using this isolation of peers and ledger data by blockchain channel may enable blockchain network members requiring private and confidential transactions to coexist with other restricted blockchain network members, even business competitors, on the same blockchain network.

A private data collection may be used to keep data private from other network members having assigned to the same blockchain channel. The actual private data comprising the private data collection may be sent peer-to-peer, e.g., via a gossip protocol, to only to peers assigned to those members of the blockchain being authorized to see the private data. The private data collection may be implemented on the authorized peer using private databases, also referred to as private state databases, comprising the respective peers. These private databases on the authorized peers may be accessible from chaincode on these authorized peers. According to embodiments, no ordering service may be involved, such that no ordering service sees the private data. The distribution of the private data peer-to-peer across authorized peers may comprise using secure communication channels between the respective peers without requiring to setup additional blockchain channels. Thus, a private data collection may enable a limited number of selected members of the blockchain network assigned to the same blockchain channel the ability to endorse, commit, and/or query private data, while all remaining members of the blockchain network assigned to the same channel have no access to the private data, without having to create a separate blockchain channel. A hash value of the private data may be computed, endorsed, ordered, and written to the ledgers of every peer on the respective blockchain channel. The hash values comprising the blockchain and accessible by all members of the blockchain network assigned to the respective channel serves as evidence of transactions comprising private data and may be used for state validation as well as for audit purposes. Each member of the limited number of selected members of the blockchain network sharing the private data collection members may decide to share the private data with other third parties. The third party may thus be enabled to compute a hash value of the private data shared and check if the computed hash value matches the state recorded on the channel ledger, i.e., the hash value stored in a transaction of the blockchain, proving that the respective state existed at a certain point in time.

Embodiments may have the beneficial effect of enabling an analysis of data that is collected over the transactions in the blockchain. Embodiments may have the beneficial effect of enabling an analysis of the transactional data recorded in a blockchain managed by a blockchain network.

The ETL-device may be provided in form of a specialized computational peer device, also referred to as an ETL-peer herein, inside the blockchain network providing the blockchain. The ETL-peer is configured to extract, transform and load transactional data recorded in the blockchain in a secure way to an external data structure, e.g., an external database. Furthermore, data analytics may be provided for executing an analysis, e.g., a predictive analysis, of the extracted and transformed data provided by the external data structure. The transformation of the extracted data may comprise a categorizing of the same.

According to alternative embodiments, the ETL-device may be provided in form of an external computational device, i.e., running outside the blockchain network, with a proper security integration to monitor data exchanged on the blockchain network, e.g., using a cryptographically secured messaging connection to a peer of the blockchain network.

The owner or owners of the blockchain may have to agree that the specialized ETL-peer becomes part of the blockchain network and gains access to the blockchain. The owner of the blockchain may for example be an entity running one or more peers constituting the blockchain network which initialized the blockchain and manages a registration of users of the blockchain, i.e., other entities running or using peers constituting the blockchain network. The registration may comprise an authorization by the owner of the blockchain to use the same. According to embodiments, the owners of the blockchain may be a group of entities forming a consortium running the peers constituting the blockchain network and being authorized for using the blockchain.

According to embodiments, the ETL-peer is always on the same information level as all other peers in the blockchain network due to synchronization. According to embodiments, the ETL-peer has additional abilities compared to other peers of the blockchain network. The ETL-peer is configured to detect events. In order to be able to extract event data, the ETL-peer is configured to notice that an event with event data to be extracted occurred. Such an event may comprise one or more transactions recorded in a block of the blockchain. According to embodiments, such an event may comprise a full block of the blockchain with a plurality of transactions inside. The event detection by the ETL-peer allows a capturing of events within the blockchain network.

The ETL-peer, before messaging event data to the external off-chain data structure, may compare the incoming event data with existing event data schemas, e.g., stored in previous blocks of the blockchain or in a local copy of a data collection accessible by the ETL-peer, and adjust the event data to be messaged accordingly. If the detected event comprises a data delete, e.g., a delete of an asset on the ledger, the peers of the blockchain network may due to the data delete recorded on the blockchain delete the respective data in local data collections. However, such a data delete recorded on the blockchain may not be executable in identical manner on the external data structure. This may in particular be the case, if the external off-chain data structure, e.g., a database, comprises a more complex logical structure than the blockchain and/or the local data collections. Deleting the same data from the external off-chain data structure may cause some trouble. If the ETL-peer is configured to compare the incoming event data from and/or for the blockchain with existing data, the ETL-peer may be enabled to send a significantly more comprehensive deleting notifications to the external off-chain data structure.

According to embodiments, the ETL-device comprises a runtime event schema selector. The schema selector may be configured to inferring an event schema from transaction payload data representing an event recorded using the blockchain using a library of known event schemas.

A library may be set up for the blockchain, comprising event schemas of event data, i.e., transactions, expected to occur. The library may contain event schemas in form of asset schemas instead of providing full transactions. Thus, a more atomic approach may be provided ensuring that free combinations of traded assets do not lead to complications. The ETL-device may have access to the library and use the same for determining an event schema for each detected event. Additional event schemas may be set up manually or automatically. The runtime event schema selector may determine which event schema is to be used for the event data, i.e., which event schema matches the logical structure of the event data. Thus, the event schema determined depends on the type of event data, i.e. the logical structure of the event data coming in. The event schema is used to map the data elements to structural elements defined by the logical structure of the external data structure. The event schema may be used to decide which mapping is applied and how often it is applied. For example, a transaction may comprise an event defining multiple asset changes of the same type. In order to take these multiple changes fully into account, the same mapping may have to be applied multiple times.

During runtime, an incoming block to be added to the blockchain may be analyzed in order to determine which types of data elements are comprising the transactions of the incoming block, e.g., which and how many assets. Besides payload data, e.g., in form of transactions, the block may further comprise metadata. The metadata as well as the payload data, e.g., assets being created, modified and/or deleted, may be tagged using the event schemas, such that appropriate transformations may be applied in a later step.

According to embodiments, the event schema determining may be executed blinded, e.g., using a JSON (JavaScript Object Notation) schema description. Embodiments may have the beneficial effect of enabling a determination of data element types without data leakage. The resulting schemas may be used to feed a mapping creator. The schemas themselves may be generated as soon as an unknown structure comes through. Such an automatic generation may facilitate the migration of the event data.

According to embodiments, machine learning may be used for generating event schemas. The ETL-device may comprise a machine learning model with an input and an output. The machine learning model may be trained to provide an event schema via the output in response to receiving event data via the input. A training in order to provide the machine learning model configured for providing event schemas may comprise providing a learning algorithm for generating the machine learning model. Furthermore, training datasets may be provided. Each training dataset may comprise training event data and a training event schema defining a logical structure of the respective training event data. The learning algorithm may be executed on the training datasets for generating the machine learning model.

The term 'machine learning' refers to a computer algorithm used to extract useful information from training datasets by building probabilistic models, referred to as machine learning models, in an automated way. The machine learning may be performed using one or more learning algorithms such as linear regression, k-nearest neighbor techniques, support vector machines or classification/regression trees etc. A 'model' may for example be an equation or set of rules that makes it possible to predict an unmeasured value or set of values, e.g., an event schema defining a logical structure of event data, from other, known values, e.g., the event data.

According to embodiments, the ETL-device further comprises an ETL-code extractor. The ETL-code extractor is configured to implement a mechanism to extract the event data from block and/or transaction data based on an event schema, e.g., using jolt. Jolt is a java library providing JSON-to-JSON transformation functionality. According to embodiments, for event data provided in JSON-format the ETL-code based on the mapping may be executed in jolt. When a specific data element of the event data is detected in a source format in the backend, the ETL-code extractor is used to transform the detected data element from a source format to a meta-format. The meta-format may still be JSON. The meta-format may not ready to be injected into the external data structure. For example, a JSON format may not be ready to be injected into SQL or another database format. Further database-specific requirements may be handled in database-connectors which may handle, e.g., the creation of database compatible insertion statements, like an SQL insertion statements, from the meta-format, like a JSON format.

According to embodiments, the ETL-device further comprises a messenger, e.g., a network communication interface, which has contact to the external data structure, e.g., a database, outside the blockchain and the blockchain network, i.e., off-chain. The messenger may be configured to transmits data via a secure channel. Furthermore, the messenger may comprise some kind of memory such that data provided for messaging does not get lost, even in case of interruptions of the messaging process.

Embodiments may have the beneficial effect of enabling an integration of event data extraction with blockchain security to provide a mechanism for event capture, avoiding high effort of implementing transformations and maintenance over time, requiring no additional data governance or data lineage.

For illustration purposes, the following example may be considered: a user purchases an insurance contract for a new item. This event may trigger a generation of an additional block to be added to the blockchain comprising a transaction that writes two additional assets. A first additional asset may be an additional user asset comprising a username, a password and maybe others information assigned to the user who purchased the insurance contract. A second additional asset may be an additional contract asset comprising information about the insurance contract as well as information about the item of concern. The information about the item of concern may, e.g., be provided as nested key-value objects. The event, i.e., the purchasing of the insurance contract recorded in the additional block of the blockchain may be detected by the ETL-device, e.g., provided in form of an ETL-peer. The ETL-peer may inherently contain and preserve the security layer implemented for handling the event data regarding the purchase of the insurance on the blockchain network. Thus, from an external perspective, all authentication measures may be taken into account. According to embodiments, a need for highly available (HA) event capture may be fulfilled ensuring an automatic reconnecting to different peer nodes of the blockchain network upon any kind of failure.

Due to the schemaless document form of data stored in blocks of the blockchain on the blockchain network, data elements of payload data, e.g., assets, may not come with a title or any additional meta-information identifying their structure. Therefore, an analysis of the logical structure of the event data and a comparing with logical structure elements of event data types known to be on the blockchain may be implemented. This may include correctly predicting the event data type even in the presence of missing fields if they are, e.g., optional for the event.

The ETL-device may be configured to approaches both a simple flattening of the event data to be extracted as well as a, potentially multi-process, formatting towards a given target data model. In the example case of SQL, the data provided by the additional user asset, additional contract asset as well as metadata information provided by the block may be mapped to a plurality of target tables, e.g., a user table comprising user related information, a contract table comprising contract related information as well as an item table comprising insurance item related information. The mapping from source structure provided by the event data in combination with event schema to target structure provided by the data model of the external data structure, e.g., a relational data model, may be done by a user without source code modification using a graphical interface. Alternatively, a machine learning module may be used. For this purpose, metadata analysis, e.g., column name, data type, may be applied in to successfully auto-generate the mapping using, e.g., machine learning techniques.

The mapping is used for generating an ETL-code that is applied to the metadata as well as asset data provided by the blockchain. According to embodiments, the ETL-device implements mechanisms to ensure that all transformations have been successful before further processing, e.g., that the "mixing" of metadata provided by the block of the blockchain into data model defining a logical structure of the external data structure is successfully processed and that a writing order of dependent tables identified using foreign key relationships is guaranteed.

According to embodiments, the loading of the transformed event data comprises messaging the transformed event data by the ETL-device via a messaging network to an external computational device external of the blockchain network. The external computational device manages the external data structure. Embodiments may have the beneficial effect that by messaging the transformed event data to the external computational device for modifying the data content of the external data structure according to the transformed event data, the event data may be provided for an off-chain usage such as, e.g., data analysis executed by a trusted data analyzer using the external data structure.

According to embodiments, the ETL-device further comprises a mapping creator. The mapping creator may be configured to separate event schema from blocks and/or transactions. In other words, payload data and metadata may be mapped on instance block and/or transaction level to an appropriate event schema. The mapping creator may further be configured to insert and/or manipulate structural IDs according to the data model to the extracted event data, e.g., public keys and/or foreign keys, for a flattening mapping as one example of JSON to relational mapping. According to embodiments, there may be other mappings as well like JSON to HBASE, etc.

The mapping creator is configured to determine, whether data coming in is transactional metadata or payload, e.g., asset, data. The mapping creator is further configured to recognize relationships between payload data and metadata. According to embodiments, the event data comprising blocks of the blockchain may besides transactional metadata comprise no metadata of the asset data. According to embodiments, the mapping creator may determine metadata of the asset data from a local data collection providing metadata relating to the payload data of the blockchain. According to embodiments, the determined relations may be used to identify relevant payload data to be extracted for modifying the data content of the external data structure.

The mapping creator may provide an easy-to-use graphical interface showing a source format, e.g., a nested JSON format, and a target format of choice, e.g., a table structure of an SQL-database or some other format of a NoSQL-database. A data steward may connect the source format with the target format. According to embodiments, the mapping may be executed using a machine learning model with an input and an output. The machine learning model may be trained to provide a mapping of the source format to the target format via the output in response to receiving both formats via the input. A training in order to provide the machine learning model configured for the source format to the target format may comprise providing a learning algorithm for generating the machine learning model. Furthermore, training datasets may be provided. Each training dataset may comprise a training source format, a training target format and a definition of a mapping of the respective training source format to the respective training target former. The learning algorithm may be executed on the training datasets for generating the machine learning model.

The aforementioned mapping may be used for creating a transformation code. Embodiments may have the beneficial effect of implementing a multi-purpose approach that allows for usage of this mapping creator for arbitrary source and target formats. According to embodiments, the mapping may be implemented in a fully automated way.

According to embodiments, the ETL-device further comprises an ETL-code generator for generating ETL-codes based on the determined event schema. An ETL-code is used to transform incoming event data into a data format that is compatible with the external data structure, e.g., a database. The ETL-code generator may translate a mapping of the source format to the target format, e.g., using jolt for JSON-to-JSON transformation. Jolt is a java library providing JSON-to-JSON transformation functionality. The ETL-code generator may take the mapping and create a jolt transformation specification using the mapping.

According to embodiments, the providing of the ETL-code comprises mapping the event data to the logical structure of the external data structure. For the mapping the determined event schema as well as the data model of the external data structure are used. Furthermore, providing of the ETL-code comprises generating the ETL-code for the event using the mapping. Embodiments may have the beneficial effect of automatically providing an ETL-code for extracting, transforming and loading the event data representing the detected event in order to modify the data content of the external data structure according to the transformed event data. The mapping may be implemented as a dynamic mapping enabling the ETL-device to transform the extracted event data to different data formats depending of the data model defining the logical structure of the external data structure. Information defining the data model of the external data structure may be provided to the ETL-device, e.g., by an external computational device manages the external data structure.

According to embodiments, the detecting of the event comprises a direct event capturing by detecting event data being provided by the ETL-peer to be added to the blockchain as part of a block of the blockchain. Embodiments may have the beneficial effect of detecting events even before they are recorded in the blockchain.

According to embodiments, the event is captured directly from a client or an orderer. Clients may propose transactions to be recorded in the blockchain, i.e., propose a chaincode invocation in order to add the transaction. According to embodiments, a client may be required to request one or more endorsing peers to agree to, e.g., sign, the results of the proposed chaincode invocation. Endorsing peers may be defined by an endorsing policy and found by means of service discovery.

An orderer may be responsible for packaging transactions into blocks and distribute them to leading peers across the blockchain network. Each member of the blockchain network, also referred to as organization, may own multiple peers on each channel the respective member subscribes to. One or more of these peers may serve as the leading peer for the respective channel, in order to communicate with a network ordering service provided in form of the orderers on behalf of the respective member. The ordering service delivers blocks to the leading peer(s) on a channel. The leading peer(s) receive the blocks and distribute them to other peers assigned to the same member. A transaction flow may comprise a proposal of transactions, a packaging of the proposed transactions into block and a validating of the blocks. The orderer may be responsible for the packaging, it may further be involved in the validating by distribution of the blocks on the blockchain network. The implementation of the orderer may, e.g., be based on Apache Kafka. Apache Kafka provides a messaging software that has high throughput fault tolerant feature. The orderer may have no persistence, no database as well as no ledger of its own.

An ordering service implemented using orderers may provide a shared communication channel to clients and peers, offering a broadcast service for messages containing transactions. Clients may connect to this channel and broadcast messages on the respective channel which are then delivered to all peers. The channel may support atomic delivery of all messages, that is, message communication with total-order delivery as well as implementation specific reliability. Thus, the channel may output the same messages to all connected peers and output them to all of these peers in the same logical order.

According to embodiments, the detecting of the event comprises monitoring data being routed on the blockchain network via the ETL-peer using a communication protocol of the blockchain network. The communication protocol may, e.g., be implemented in form of a gossip protocol. Embodiments may have the beneficial effect that the ETL-peer as a member of the blockchain network is provided with access to data being routed on the blockchain network without spoiling security of the inter blockchain network communication. In particular, security of a permissioned blockchain network may be maintained. Transactions in the blockchain network may be sent and received between peers via the communication protocol.

The ETL-peer may receive propagated event data to be added to the blockchain via the communication protocol, e.g., the gossip protocol, and wait for peer consensus to accept the propagated event data in the blockchain. As soon as this consensus is achieved, the ETL-peer may append the received event data, like all other peers of the blockchain network receiving the respective event data via the gossip protocol, to a local data collection, e.g., an internal state database. Furthermore, the ETL-peer may detect the event data as data representing an event relevant for modifying the data content of the external data structure and provide the event data to the external data structure of the outside world, i.e., computational devices outside the blockchain network, using an ETL-code. The ETL-peer listening to the gossip protocol refers to the aforementioned method of event data via the gossip protocol, storing the same in a local data connection in case of a peer consensus and in addition providing the event data to the external data structure.

According to embodiments, the ETL-device has access to a plurality of blockchains provided by the blockchain network. Embodiments may have the beneficial effect that the ETL-device may provide access for a trusted data analyzer using the external data structure to a plurality of blockchains. The blockchains may be owned by the same owner/owners or different owners.

For example, the trusted data analyzer may have access to different blockchain of different owner, e.g., insurances, via the external data structure. The trusted data analyzer may analyze the event data provided by the external data structure and predict actions needed to be taken in response to the events represented by the event data. For example, the trusted data analyzer may detect a massive number of transactions of the same kind happening in the same area, e.g., transactions relating to insurances in case of a natural disaster like wildfire, flooding, etc. The trusted data analyzer may inform an external regulation instance about the massive number of transactions indicating that problems for insurance companies involved in these transactions may arise due to large potential damage sums.

The ETL-device may provide a beneficial infrastructure to provide such a trusted data analyzer performing those predictions with relevant event data managed in using blockchains. Thus, a comprehensive and easy-to-use method may be provided for the trusted data analyzer by the ETL-device to get the relevant information for performing analyses, determining necessary actions based on the analysis and/or triggering the respective necessary actions on time from arbitrary blockchain applications.

According to embodiments, the blockchains may have the same owner. For example, a company may own or use a plurality of blockchains and use the event data recorded in the blockchains for managing the company, business intelligence, etc. The trusted data analyzer may use the ETL-device to provide data analysis for the respective company using all the blockchains.

According to embodiments, the external data structure receives transformed event data from a plurality of ETL-peers, each ETL-peer being member of a different blockchain network providing a different blockchain. Embodiments may have the beneficial effect that the external data structure takes into account event data from a plurality of blockchains. As described before this event data may be used by a trusted data analyzer for performing data analysis without requiring a direct access of the data analyzer to all the blockchains and/or all the blockchain networks. In this case, a plurality of ETL-peers is used for implementing an infrastructure providing the trusted data analyzer with information required for its analyses.

According to embodiments, the event schema is determined using a library providing one or more event schemas identifying logical structures of event data representing types of events potentially occurring on the blockchain network. The library may, e.g., provide event schemas identifying logical structures of event data representing types of events potentially comprising the blockchain. Embodiments may have the beneficial effect that the event schema may be determined by comparing the event data representing the event with the event schemas provided by the library. If an event schema provided by the library matches the logical structure of the event data of the detected event, the respective event schema may be selected to identify the logical structure, i.e., determine the logical role or meaning of data elements of the event data. According to embodiments, the logical schema may take into account optional data elements which may be comprising the event data matching a specific event schema, but are not required to be present in order for the event data to match the respective event schema.

According to embodiments, in case none of the event schemas provided by the library matches the logical structure of the event data of the detected event, the method further comprises analyzing the logical structure of the event data of the detected event, determining an additional event schema matching the logical structure of the event data of the detected event, and adding the additional event schema to the library. Embodiments may have the beneficial effect of providing a method for providing an event schema even in case event data representing an event comprises a logical structure unknown, i.e., not matching any event schema comprising the library. According to embodiments, the analyzing of the logical structure of the event data and/or the determining of the additional event schema matching the logical structure of the event data of the detected event are executed manually. According to embodiments the respective analyzing of the logical structure and/or the determining of the additional event schema are executed automatically. For example, the analyzing and/or determine are implemented using machine learning.

According to embodiments, the determining of the event schema comprises tagging one or more data elements comprising the event data using the determined event schema. The tags identify structural types of data elements defined by the determined event schema. Embodiments may have the beneficial effect of providing the event data with information in form of the tags identifying structural types of data elements of the event data. This information may be used for mapping the data elements comprising the event data to the logical structure of the external data structure defined by the data model of the external data structure.

According to embodiments, the tags are used for mapping tagged data elements to structural elements defined by the logical structure of the external data structure. Embodiments may have the beneficial effect of using the tags for identifying logical correspondences between data elements of the event data and logical categories of the logical structure of the external data structure.

According to embodiments, the external data structure is provided in form of a database and a database management system for managing the database using the data model. Embodiments may have the beneficial effect of giving off-chain entities access to the event data in an effective and efficient way using the external data structure. An off-chain entity, i.e., an entity not being part of the blockchain network, may, e.g., be a data analyzer, requiring access to the event data in order to analyze their content. Thus, different types of external entities may be given access to the event data using the ETL-device without requiring to further modify the blockchain network or any of the peers comprising the blockchain network. The database and a database management system may be optimized for the purposes of the external entity or entities using the database as source of the event data, e.g., for performing data analysis operations.

According to embodiments, the data model used by the database management system for managing the database is one of the following data models: a relational data model, a hierarchical data model, a network data model, an object-oriented data model, a graph data model, an entity-relationship model data model, a key value data model, a multidimensional data model, a column-oriented data model, a document oriented data model and a data stream data model. Embodiments may have the beneficial effect of enabling a transformation of the extracted event data by the ETL-device using an ETL-code to arbitrary target data formats. The target data format may be determined by the data model of the external database to be modified using the event data. The respective database may be a SQL-database or a NoSQL-database.

According to embodiments, the transforming of the extracted event data comprises adding one or more structural IDs according to the data model to the extracted event data. Embodiments may have the beneficial effect that the transformed data may better resemble the logical structure of the external data structure defined by the data model. The transformed data may thus be provided in a more compact, e.g., normalized way. For example, message duplication may thus be suppressed to prevent double sending.

According to embodiments, the structural IDs comprise one or more of the following: a primary key and a foreign key. Embodiments may have the beneficial effect of preventing doubling of events due to usage of primary keys (PK) and foreign keys (FK) in case of a relational target, i.e., a relational external data structure. In SQL specific context, PKs and FKs may be used to suppress message duplication in order to prevent double sending.

According to embodiments, the structural IDs comprise relational edges. Such relational edges may, e.g., be used in a graph database, i.e., a database that uses graph structures for semantic queries with nodes, relational edges and properties to represent and store data. Relational edges directly relate data items by representing the relationships between the data items represented as nodes. Querying relationships within a graph database may be fast due to the fact that they are within the database itself. Graph database may thus enable an intuitive visualization of relationships beneficial for heavily inter-connected data. Embodiments may have the beneficial effect of enabling a transformation of the event data to a data format of the external data structure if the external data structure is a graph database. In NoSQL specific context, e.g., structural IDs in form of relational edges may be added.

In a relational model of databases, a primary key refers to a specific choice of a minimal set of attributes, i.e., columns, that uniquely specify a tuple, i.e., row, in a relation, i.e., table. A primary key may e.g., be an attribute identifying a record, i.e., a unique id. More generally, a primary key is a choice of candidate key, i.e., a minimal super-key. Any other candidate key may be referred to as an alternate key. In the context of relational databases, a foreign key refers to a field or collection of fields in a table which uniquely identifies a row of another or of the same table. Thus, a foreign key referring to a primary key in a first table is defined in a second table. In a normalized database index keys in form of foreign keys may be used instead of the actual values, referring to values stored in separate tables. For example, a table called user table has a primary key called user_id. Another table called contract table has a foreign key which references to user_id in order to uniquely identify the relationship between the two tables.

According to embodiments, the ETL-device is used for ensuring consistency of the external data structure. Since the data in the closed blocks of the blockchain cannot be changed later, errors in the external database may be detected and corrected using a consistency check. The consistency check may comprise matching data received from the ETL-device with data stored in the external data structure. The ETL-device may, e.g., record the ETL-codes executed and re-execute a selection or all of them. For example, the ETL-device may perform the re-execution in response to a request by a computational device managing the external data structure. Thus, a kind of backwards proofing of the extracted data may be implemented.

According to embodiments, the transforming of the extracted event data comprises a flattening of the extracted event data. Embodiments may have the beneficial effect of transforming the extracted event data enforcing little to no structural adjustments. The data model of the external data structure may define only few structural requirements structure, i.e., the external data structure may be a denormalized database. For reporting and analytics, a flat structure may be advantages and may help performance.

According to embodiments, the extracted event data comprises metadata and payload data. Embodiments may have the beneficial effect that not only payload data provided by transactions reordered in the blocks of the blockchain is taken into account, but also metadata. Metadata may for example comprise a timestamp identifying a point in time at which the block comprising the respective transactions was generated. This point of time may be identified as the time of the occurrence of the respective event recorded in the blockchain in form of a transaction. Metadata may for example comprise a creator ID of a creator of the block comprising the respective transactions. The respective creator may be considered the creator of the event data provided in form of the respective transactions.

According to embodiments, the extracting of event data, in case the detected event comprises a data delete, further comprises executing a callback in order to retrieve additional data from the blockchain network and using the additional data to determine one or more data elements to be deleted from the external data structure in order to modify the data content of the external data structure in accordance with the data delete. Embodiments may have the beneficial effect of providing an efficient and effective method to take into account also data deletes for modifying the data content of the external data structure. Embodiments may enable the ETL-device to determine which data to be deleted in order to implement the data delete in the external data structure, even in case logical and/or structural dependencies differ in case of the external data structure relative to the blockchain and even in case the blockchain only comprises IDs identifying actual values to be deleted rather than the respective values.

The blockchain may be used for recording events of an underlying data structure managed by a client using the blockchain provided by the blockchain network. The underlying data structure, may, e.g., be a data collection like a data base. According to embodiments, the ETL-device may comprise or have access to a local copy of the respective underlying data structure and update the same for each event occurring on the original underlying data structure and/or another copy of the underlying data structure. In the case of a deleting of data in an underlying data structure of the form of a key-value store, a transaction representing the deleting recorded in the blockchain may only contain a statement to set a key assigned to the respective data to be deleted to "null". In other words, a state of the data within the blockchain may, e.g., be stored in a key-value database. In case of a deletion, the key is set invalid without content specification. Due to a possibly arbitrary complexity of a transformation required to implement the recorded deleting of data in the underlying data structure, i.e., source database, towards the external data structure, i.e., target database, the handling of the respecting deleting may require a multi-step processing. Therefore, a mechanism may be provided that is enabled to catch the full data structure of an event even in the case that the entry is deleted. The ETL-device may be configured to directly perform a callback before the key is deleted from the key-value-data-storage, i.e., a local copy of the underlying data structure. Thus, the actual value to be deleted may be determined using the key before it is deleted. According to embodiments, alternatively or additionally a query of the blockchain may be performed by the ETL-device in order to find the most recent entry identifying a value assigned to the key to be deleted. This may always be possible, since transactions are in general not erasable from a blockchain, once they have been suitably integrated into the blockchain structure.

A call-back function may be executed in case "isDelete" is true on write-set of a transaction. As an illustrative example, the following read-set and write-set of a transaction may be considered:

```
<TxReadWriteSet>
    <Ns ReadWriteSet name="chaincode1">
        <read-set >
            <read key="K1", version="1">
            <read key="K2", version="1">
        </read-set>
        <write-set>
            <write key="K1", value="V1"
```

-continued

```
    <write key="K3", value="V2"
    <write key="K4", is Delete="true"
    </write-set >
  </NsReadWriteSet>
<TxReadWriteSet>
```

When receiving the "<write key="K4" . . . ", the value referred to is empty, and "isDelete" is set to "true". Based on this information alone, it is not possible to determine which value is deleted. Therefore, a callback function may be executed to query, e.g., from the ledger, the actual value of key "K4" before it is deleted. The external data structure may not comprise and/or know the ID "K4". Thus, the actual value is required to inform the external data structure which value has to be deleted according to the data delete defined by the transaction.

According to embodiments, the callback targets the blockchain provided by the blockchain network or a local data collection provided by a peer of the blockchain network. For example, the local data collection is provided by the ETL-device configured as a peer of the blockchain network, i.e., an ETL-peer. Embodiments may have the beneficial effect of enabling the ETL-peer to determine actual data values to be deleted, even in case the blockchain only comprises IDs identifying actual data values to be deleted rather than the respective data values. The actual data values may be retrieved from a local data collection, in particular before an ID identifying the respective data value is deleted, or from a most recent block of the blockchain comprising a transaction assigning the ID to an actual data value. After the actual data value has been determined, the respective ID and/or the respective data value may be deleted from the local data collection in compliance with the data delete defined by the event data.

According to embodiments, the event data is extracted from a block of the blockchain provided by the blockchain network.

According to embodiments, the blockchain is a permissioned blockchain with restricted access to extract data from the blockchain. The ETL-device is registered and comprises access rights enabling the ETL-device to extract data from the blockchain. Embodiments may have the beneficial effect of implementing a method to access the event data handled within the blockchain network using the ETL-device, e.g., in form of an ETL-peer, as a register and authorized member of the blockchain network to extract event data, while complying with security setting of the blockchain network providing the permissioned blockchain.

Thus, access to event data recorded on the blockchain may be tied to a successful registration of the ETL-peer to the ledger. Any harmful listening may only be possible as a consequence of ID theft or forgery. However, using certificates including proper cryptographic keys and/or secure passwords such misuses may be effectively prevented. Without valid credentials, it is not possible to read and decrypt data exchanged on the blockchain network.

Embodiments may have the beneficial effect of enabling an implementation of a full data lineage for the data comprising the blockchain. Furthermore, full data lineage may also be implemented for data assigned to the blockchain and stored within the blockchain network, e.g., a private data collection. A full data lineage may ensure that it is known which entity does what with the data in a system, i.e., in the blockchain network.

According to embodiments, the blockchain comprises encrypted data, wherein the ETL-device has access to a decryption key. The extracting of event data comprises decrypting the event data. Embodiments may have the beneficial effect that the ETL-device given access even to encrypted data provided by the blockchain.

According to embodiments, the extracting of event data further comprises retrieving additional event data from a local data collection provided by a peer of the blockchain network. For example, the local data collection is provided by the ETL-device configured as a peer of the blockchain network, i.e., an ETL-peer. The additional event data is assigned to the event data extracted from the block of the blockchain. Embodiments may have the beneficial effect that the ETL-peer may have access to addition event data which is not recorded and/or routed via the blockchain, but rather managed in form of local data collections.

According to embodiments, the local data collection is a private data collection shared by a limited set of peers of the blockchain network and private data of the private data collection is routed using cryptographically secured communication connections restricted to use by the peers of the limited set of peers only. For example, the ETL-device is configured as a peer of the blockchain network, i.e., an ETL-peer, and a member of the limited set of peers.

Privacy may be of high importance for blockchain applications. In default mode, transactions may be written in plaintext to the blocks. However, such an approach may be unwanted in cases that the execution transaction itself should be transparent, but not its content. For example, a business application may comprise supply chain provenance tracking containing data about wholesale prices for objects, which should not be seen by an end user having access to the blockchain. A countermeasure may, e.g., comprise including only hash values of private, i.e., confidential, data into the blocks of the blockchain and providing the private data in form of private data collections located in permissioned storages on peers of the blockchain network, like the ETL-peer, which belong to the permissioned entities on the ledger with authorization to access the private data. These peers may communicate by alternative means using a communication protocol of the blockchain network, e.g., using a gRCP-connection. Thus, the built-in ETL-peer may be enabled to participate in an exchange of private data implemented by the communication protocol without compromising security aspects.

Embodiments may have the beneficial effect of enabling an implementing and preserving of data restrictions. Restricted data may be stored in a private data collection which is not part of the blockchain. The blockchain may for example only comprise an indicator of the private data, e.g., in form of a hash value of the respective private data.

According to embodiments not only event data comprising the blockchain may be extracted, but also event data comprising one or more private data collections. Private data may comprise information, like, e.g., selling prices, hidden from other participant of the ledger, may not be comprising blocks of the blockchain, but rather provided in form of a proving hash of the respective private data. it. In contrast all the data handled by the blockchain may be processed on the communication protocol of the blockchain network, including sharing private data between selected peers via secure channels, wherein the selected peers may have the private data stored in a private data collection. Thus, embodiments may have the beneficial effect of enabling a comprehensive data extraction which is able to access the full communication protocol, comprising data transfers not or not in clean form part of the blockchain.

According to embodiments, the loading comprises a write request using the transformed data. Embodiments may have the beneficial effect of enabling a modifying of the data content of the external data structure using the transformed data.

According to embodiments, the write request comprises a request for at least one of the following: updating a data element of the data content of the external data structure using the transformed data, deleting a data element of the data content of the external data structure identified by the transformed data, and inserting an additional data element provided by the transformed data into the data content of the external data structure. Embodiments may have the beneficial effect that not only additional data elements may be added to the data content of the external data structure due to an event represented by the transformed event data, but also existing data elements updated or deleted.

Thus, the ETL-device, before messaging event data to the external off-chain data structure, may compare the incoming event data with existing event data, e.g., stored in previous blocks of the blockchain or in a local copy of a data collection accessible by the ETL-device, and adjust the event data to be messaged accordingly. If the detected event comprises a data delete, e.g., a delete of an asset on the ledger, the peers of the blockchain network may due to the data delete recorded on the blockchain delete the respective data in local data collections. However, such a data delete recorded on the blockchain may not be executable in identical manner on the external data structure. This may in particular be the case, if the external off-chain data structure, e.g., a database, comprises a more complex logical structure than the blockchain and/or the local data collections. A deleting the same data from the external off-chain data structure may cause some trouble. If the ETL-device is configured to compare the incoming event data from and/or for the blockchain with existing data, the ETL-device may be enabled to send a significantly more comprehensive deleting notifications to the external off-chain data structure.

According to embodiments, the computer program product further comprises computer-readable program code configured to implement any of the embodiments of the method for a model-driven extraction of event data representing an event occurring on a blockchain network by a computational device with access to the blockchain network described herein.

According to embodiments, the computational device, i.e., ETL-device, with access to the blockchain network further is configured to execute any of the embodiments of the method for a model-driven extraction of event data representing an event occurring on a blockchain network described herein.

Embodiments may have the beneficial that since the data extraction performed by the ETL-device is event-triggered, a near real-time extraction of event data may be provided using the ETL-device. Event detection may, e.g., be implemented using an EventHub or Channel Event Hub subscription of the Hyperledger Fabric and Apache NiFi. Event Hub as well as Channel Event Hub provide an event notification service for the Hyperledger Fabric. Apache NiFi enables an automating of flow of data between software systems based on a flow-based programming model and offers features like an ability to operate within clusters, security using TLS encryption, and extensibility. The ETL-device, provided in form of an ETL-peer, may further provide an on-chain event data schema discovery from transaction read-write sets, even without meta data. A graphical mapping from on-chain JSON format of the event data towards arbitrary data formats used by the external data structure, e.g., SQL, may be implemented. For such a JSON format to X format transformation, the ETL-device may, e.g., use the jolt library and/or meta-formats. Embodiments may have the beneficial effect that no hard coding of the transformations is implementing, thus the same ETL-device may be used for transformations to different target formats. The ETL-device may furthermore provide an SQL insertion mechanism and/or a logic for inserting and/or updating key constraints. According to embodiments, data lineage may be integrated. Data integration, as the example of NiFi shows, may be used together with Apache Atlas. Apache Atlas provides a scalable and extensible set of core foundational governance services enabling to effectively and efficiently meet compliance requirements. Open metadata management and governance capabilities are provided to build a catalog of data assets, classify and govern these assets and provide collaboration capabilities around these data assets.

The ETL-device may comprise a messenger, e.g., network communication interface, providing a communication connection via a network outside the blockchain network to an external computational device manages the external data structure. The ETL-device comprise a design module providing a model-driven event data mapping for use as input by an ETL-code generator for generating an ETL-code. The ETL-code generator may be comprising the design module. The design module may comprise a mapping creator as well as a code generator. The ETL-device may comprise the runtime source extractor for capturing events and discovering the kind of data elements comprising the event data representing the respective events. The runtime source extractor may comprise the event detector as well as the runtime schema selector. The ETL-device may further comprise a runtime source-to-target-transformer for executing the ETL-code. For this purpose, the source-to-target-transformer may comprise an ETL-code executor.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of an exemplary computational device 10 is shown. The computational device 10 is configured as an ETL-device for executing an ETL-code. The ETL-device may be comprising a blockchain network in form of an ETL-peer. Alternatively, the ETL-device is an external computational device configured to monitor data exchanged on the blockchain network using a cryptographically secured messaging connection to a peer of the blockchain network. According to embodiments, the computational device may be implemented as a cloud computing node. Computational device 10 is only one example of a suitable computational device and is not intended to suggest any limitation as to the scope of use or functionality of embodiments of the invention described herein. Regardless, computational device 10 is capable of being implemented and/or performing any of the functionality set forth hereinabove.

The computational device 10 may be a computer system/server, which is operational with numerous other general purposes or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computational device 10 may be described in the general context of computer system-executable instructions, such as program modules, being executed by a computer system. Generally, program modules may include routines, programs, objects, components, logic, data structures, and so on that perform particular tasks or implement particular abstract data types. Computational device 10 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computational device 10 is shown in the form of a general-purpose computational device. The components of computational device 10 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Video Electronics Standards Association (VESA) local bus and Peripheral Component Interconnect (PCI) bus, such as e.g., PCI, PCI-X and PCIe.

Computational device 10 typically includes a variety of computer system readable media. Such media may be any available media that is accessible by computational device 10, and it includes both volatile and non-volatile media, removable and non-removable media.

System memory 28 can include computer system readable media in the form of volatile memory, such as random-access memory (RAM) 30 and/or cache memory 32. Computational device 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computational device 10 may also communicate with one or more external devices 14 such as a keyboard, a pointing device, a display 24, etc.; one or more devices that enable a user to interact with computational device 10; and/or any devices (e.g., network card, modem, etc.) that enable computational device 10 to communicate with one or more other computing devices. Such communication can occur via Input/Output (I/O) interfaces 22. Still yet, computational device 10 can communicate with one or more networks such as a local area network (LAN), a general wide area network (WAN), and/or a public network (e.g., the Internet) via network adapter 20. As depicted, network adapter 20 communicates with the other components of computational device 10 via bus 18. It should be understood that although not shown, other hardware and/or software components could be used in conjunction with computational device 10. Examples, include, but are not limited to: microcode, device drivers, redundant processing units, external disk drive arrays, RAID systems, tape drives, and data archival storage systems, etc.

Figure 2:
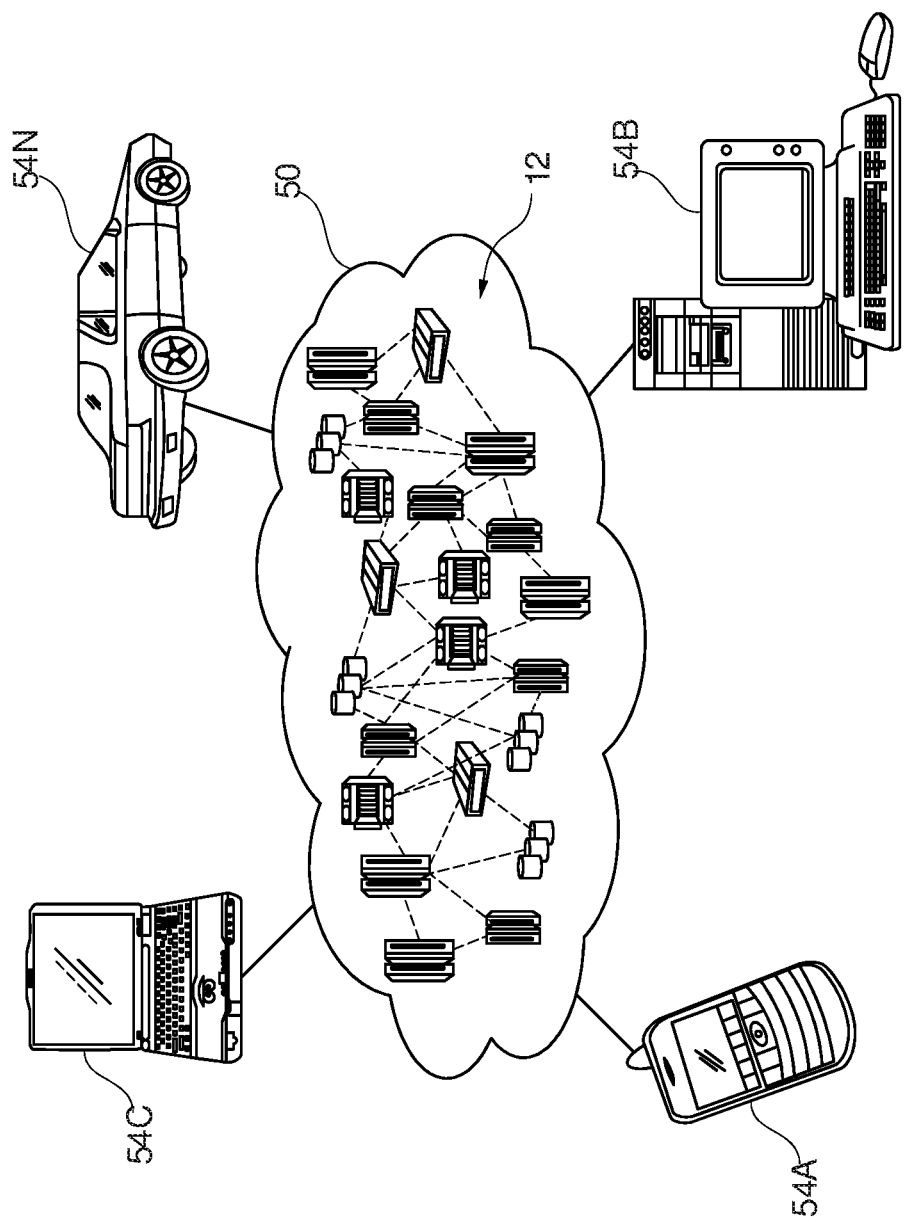
FIG. 2 depicts a schematic diagram illustrating an exemplary cloud computing environment according to an embodiment.

Referring now to FIG. 2, illustrative cloud computing environment 50 is depicted. As shown, cloud computing environment 50 comprises one or more cloud computing nodes 12 with which local computing devices used by cloud consumers, such as, for example, personal digital assistant (PDA) or cellular telephone 54A, desktop computer 54B, laptop computer 54C, and/or automobile computer system 54N may communicate. Nodes 12 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 12 and cloud computing environment 50 can communicate with any type of computerized device over any type of network and/or network addressable connection (e.g., using a web browser).

Figure 3:
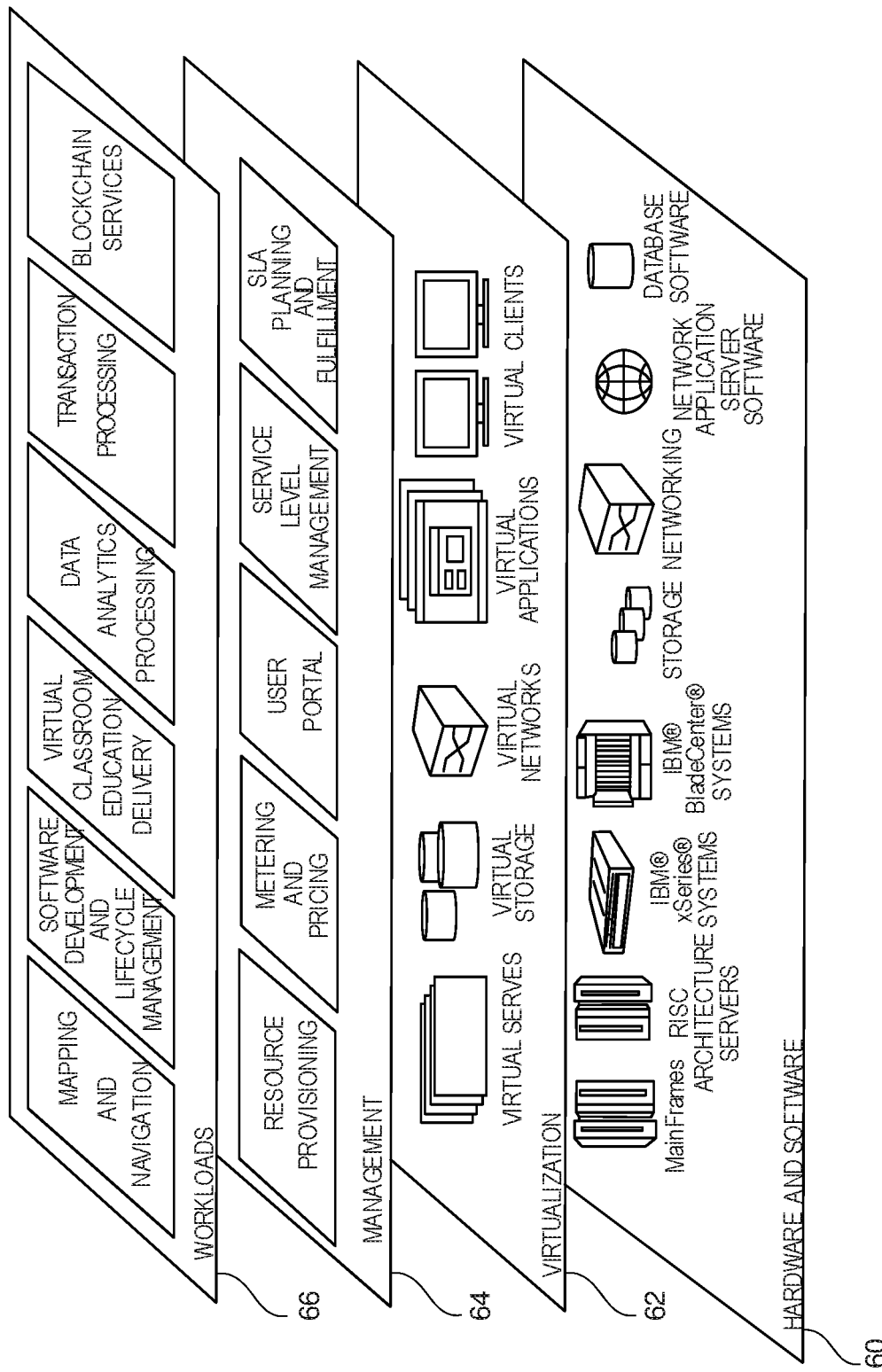
FIG. 3 depicts schematic diagram illustrating exemplary abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture-based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. For example, cloud storage locations, e.g., a virtual storage of virtualization layer 62, may be provided. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. For example, the identity of a user trying to access storage locations provided by the cloud infrastructure may be verified. User portal provides access to the cloud computing environment for consumers and system administrators, e.g., access to storage locations provided by the cloud infrastructure. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; blockchain services for recording event data and executing a model-driven extraction of the recorded event data from the blockchain.

Figure 4:
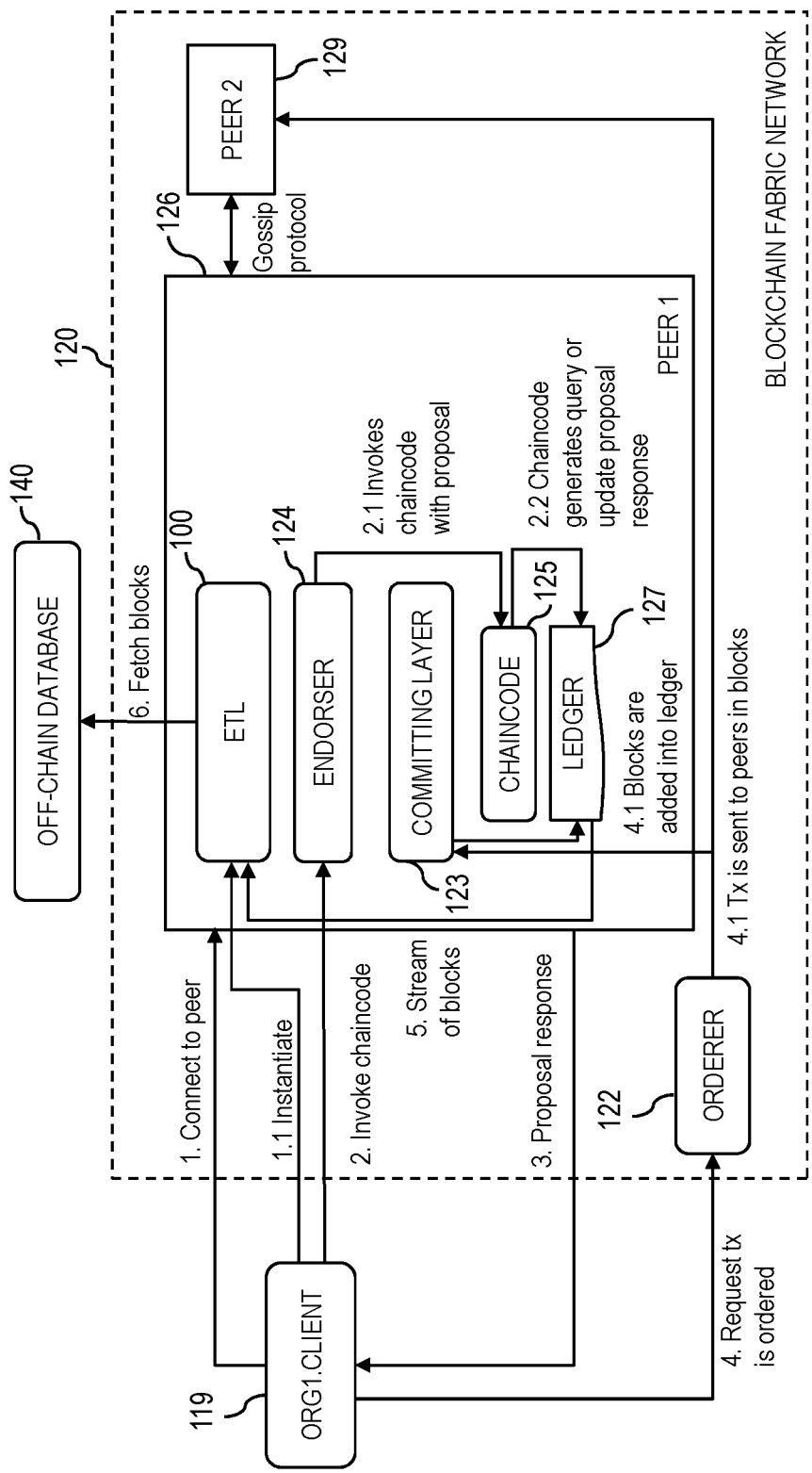
FIG. 4 depicts a schematic diagram illustrating an exemplary blockchain network comprising an ETL-peer.

FIG. 4 depicts a schematic diagram illustrating an exemplary blockchain network 120 comprising an ETL-device in form of a peer 126 providing an ETL-capability 100, i.e., being configured as an ETL-peer. The peer 126 may, e.g., be implemented in form of the computational device 10 of FIG. 1. A client 119 of a first organization "ORG1.Client" may use a blockchain 127, also referred to as a ledger, to record transactions. These transactions may comprise any type of information to be stored in the ledger 127. The ledger 127 may be a permissioned ledger, i.e., only registered and authorized members are allowed to access the ledger 127. The client 119 may not be part of the blockchain network 120 and connect to a first peer 126 of the blockchain network 120. The blockchain network 120 may comprise further peers, e.g., peer 129. The peers 126, 129 of the blockchain network 120 may share data using a communication protocol of the blockchain network, e.g., a data dissemination gossip protocol. The communication protocol may ensure that all peers of the blockchain network 120 share the same data. The client 119 may initiate an ETL-capability 100, which, e.g., is provided by the first peer 126. Thus, the first peer 126 is configured as an ETL-peer. According to alternative embodiments, the ETL-capability 100 may be provided by another independent peer of the blockchain network 120. The ETL-capability 100 may be configured for providing and executing an ETL-code. The ETL-code comprises a set of machine-executable instructions configured for extracting event data from a block of the ledger 127, transforming the extracted event data using the event schema to comply with a data model defining a logical structure of the external data structure, e.g., an off-chain database 140 and loading the transformed data to the off-chain database 140 for modifying a data content of the off-chain database 140.

The client 119 may invoke a chaincode 125 by requesting an endorsing capability 124, also provided by the first peer 126 and referred to as an endorser, to agree to, e.g., sign, the proposed chaincode invocation. According to alternative embodiments, the endorser 124 may be provided by another independent peer of the blockchain network 120. The endorser 124 checks the proposed chaincode invocation, signs it, in case it satisfies an endorsing policy defined by the endorser 124, and invokes the chaincode 125 with the proposal. The chaincode 125 may for example generate a query or update a proposal response using the ledger 127. A proposal response is provided by peer 126 to the client 119 in reply to the invoking of the chaincode 125.

In order to add a transaction (tx) to the ledger 127, the client 119 may sent a request transaction to an orderer 122 providing an ordering service. The orderer 122 is responsible for ordering transactions and packaging the ordered transactions into blocks. The ordered transactions are sent by the orderer 122 in blocks to a committing layer 123 provided by peer 126. Upon achieving a consensus to accept the block to the blockchain, the blocks are committed to the ledger 127 by the committing layer 123. Blocks which are committed to the ledger 127 are forwarded to the ETL-capability 100, resulting in a stream of blocks. For example, each block being added to the ledger 127 may be detected as an event represented by event data comprising the blocks.

The ETL-capability 100 executes the ETL-code to extract event data provided by the transactions from the received blocks, transform the event data to comply with a data model of the off-chain database 140 and loads the transformed event data to the off-chain database 140. Thus, the off-chain database 140 is enabled to fetch the event data comprising the blocks from the ledger 127 using the ETL-capability 100. The off-chain database 140 may for example be used by a data analyzer to analyze the event data outside the blockchain network 120. A database management system may, e.g., use a data model to manage the data comprising the off-chain database 140 using a logical structure optimized for an intended use of the extracted event data, e.g., an analysis by the data analyzer.

Figure 5:
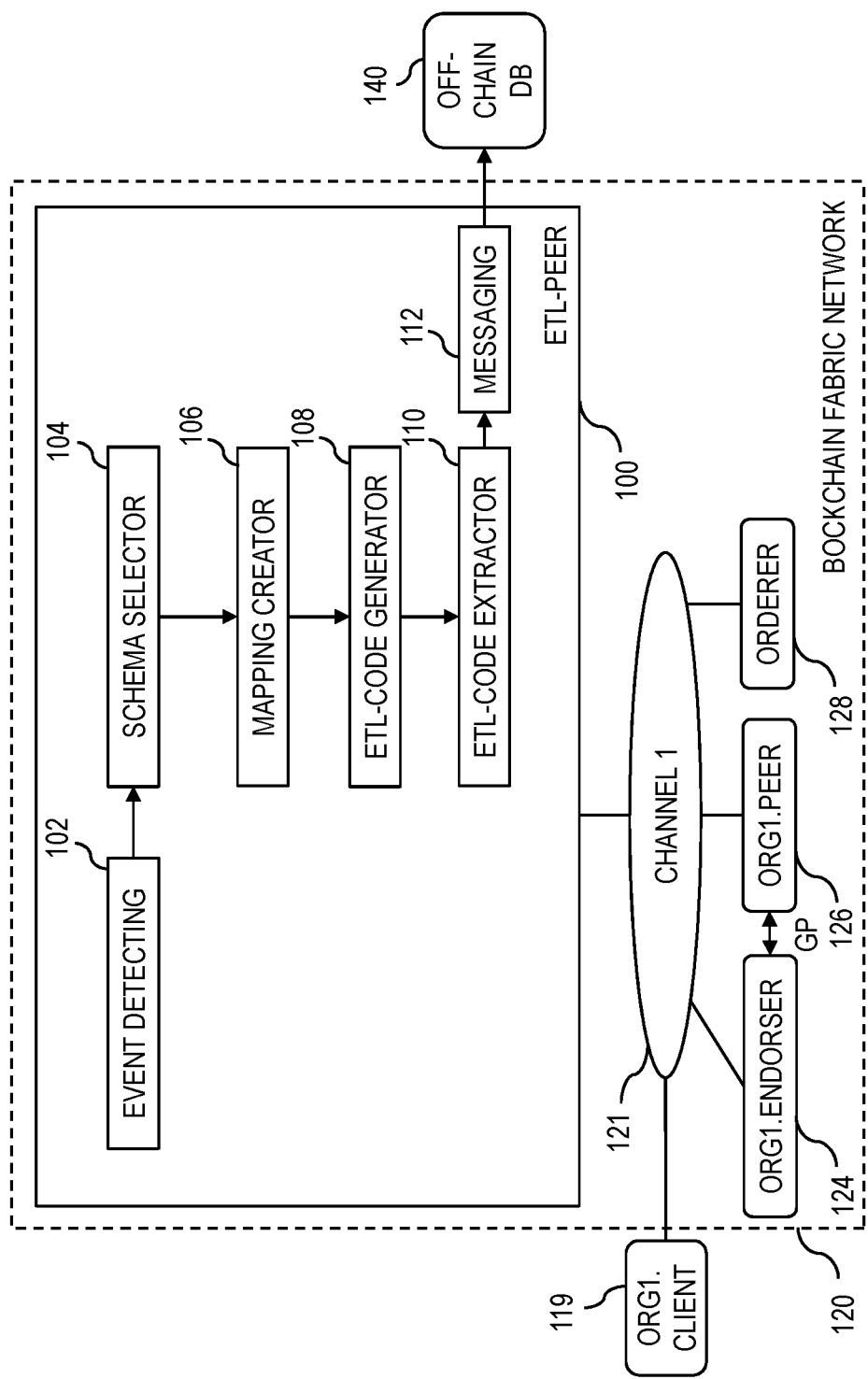
FIG. 5 depicts a schematic diagram illustrating an exemplary blockchain network comprising an ETL-peer.

FIG. 5 depicts a schematic diagram illustrating an exemplary blockchain network 120 comprising an ETL-device provided in form of an ETL-capability 100. The ETL-capability 100 may, e.g., be implemented in form of the computational device 10 of FIG. 1. In case of the blockchain network 120 shown in FIG. 5, the endorser 124 "ORG1.ENDOSER" as well as the ETL-capability 100 are each provided independently of the first peer 126, i.e., in form of an independent endorsing peer 124 and an independent ETL-capability 100. Data within the blockchain network 120 may be routed between the first peer 126 and the endorsing peer 124 using a gossip protocol (GP). The client 119 may communicate with the ETL-capability 100, the endorsing peer 124, the first peer 126 as well as the orderer 128 via a common blockchain channel 121 "CHANNEL 1". The ETL-capability 100 may comprise an event detector for detecting events represented by event data. Event detecting 102 may comprise direct event capturing and/or capturing of events via the gossip protocol. The event detecting 102 may further comprise a callback on delete-transactions. A schema determining selector 104 is provided for determining events schemas for the event data of the detected events. The respective event schemas may be provided by one or more libraries used by the ETL-peer. Event schemas may be determined by comparing the event data and their logical structures with the logical structures identified by the event schemas. The event schema determined by the event schema selector 104 may be used by a mapping creator 106 to create a mapping of the data elements comprising the event data and assigned with a logical data element type by the event schema to a logical structure defined by a data model of the off-chain database 140. The mapping may be performed on instance level taking into account payload data, i.e., asset data, as well as metadata comprising the transactions of the blocks of the blockchain provided by the blockchain network 120. According to embodiments, further structural IDs, such as private keys and/or foreign keys, may be inserted into the event data and/or manipulated. An ETL-code generator 108 generates an ETL-code to be executed by the by the ETL-peer in order to extract, transform and load the event data representing the detected events from the blocks of the blockchain. The ETL-code is generated using the mapping defined based on the event schema of the event data as well as the data model of the off-chain database 140. The ETL-code generated by the ETL-code generator is executed by the ETL-capability 100. An ETL-code extractor 110 is used to extract the event data from the blocks and transactions using the determined event schemas. The extracted event data is transformed to comply with the data model defining the logical structure of the off-chain database 140 and loaded into the off-chain database 140 using a messenger 112 of the ETL-capability 100 configured to establish a communication connection from the ETL-capability 100 comprising the blockchain network 120 to the external off-chain database 140 located outside of the blockchain network 120.

Figure 6:
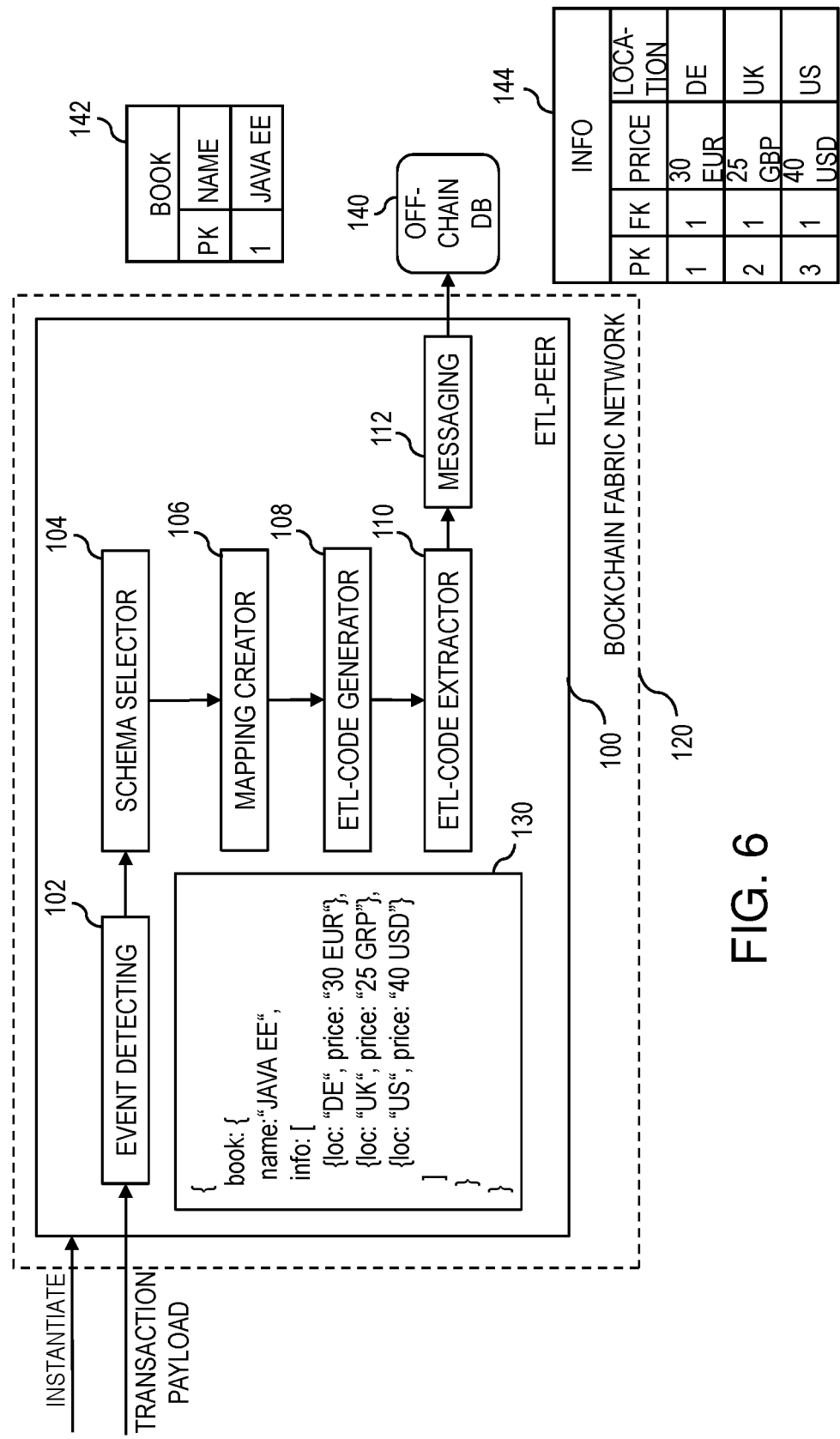
FIG. 6 depicts a schematic diagram illustrating an exemplary blockchain network comprising an ETL-peer.

FIG. 6 depicts a schematic diagram illustrating an exemplary blockchain network 120 comprising an ETL-device provided in form of an ETL-capability 100. The ETL-capability 100 may, e.g., be implemented in form of the computational device 10 of FIG. 1. The blockchain network 120 and ETL-capability 100 of FIG. 6 are identical with the blockchain network 120 comprising an ETL-capability 100 of FIG. 5. FIG. 6 illustrates in more detail the event data handled by the ETL-capability 100. The ETL-capability 100 may be instantiated by a client outside the blockchain network 120 and receive a block 130 committed to the blockchain provided by the blockchain network 120. The block 130 may comprise transaction payload data, e.g., a transaction of the following form:

```
{
  book: {
    name:"JAVA EE",
    info: [
      {loc: "DE", price: "30 EUR"},
      {loc: "UK", price: "25 GRP"},
      {loc: "US", price: "40 USD"}
    ]
  }
}
```

This transaction defines an additional asset in form of a book with the name "JAVA EE" and provides additional information regarding this item, i.e., the book. The additional information defines prices of the book in DE, UK, and US.

The data model of the off-chain database 140 may be a relational data model. Thus, the event data comprising the block 130 may be transformed into a format complying with the respective data model using an event schema determined for the transaction of block 130 and the relational data model of the off-chain database 140. The resulting transformed event data may have the logical structure of two tables. A first table may be a book-table identifying the book and having the following form:

| BOOK | |
|---|---|
| PK | NAME |
| 1 | JAVA EE |

The table "BOOK" comprises the name of the book "JAVA EE" assigned with a primary key. Furthermore, a second table is provided with the additional information. The second table has the following form:

| INFO | | | |
|---|---|---|---|
| PK | FK | PRICE | LOCATION |
| 1 | 1 | 30 EUR | DE |
| 2 | 1 | 25 GBP | UK |
| 3 | 1 | 40 USD | US |

The table "INFO" provides a price for each location assigned with a primary key. Furthermore, each of the price information is assigned with the same foreign key "1" pointing to the first key of the book table. Thus, it is sufficient to store the information of the book table only ones, instead of storing a copy for each of the different price information.

Figure 7:
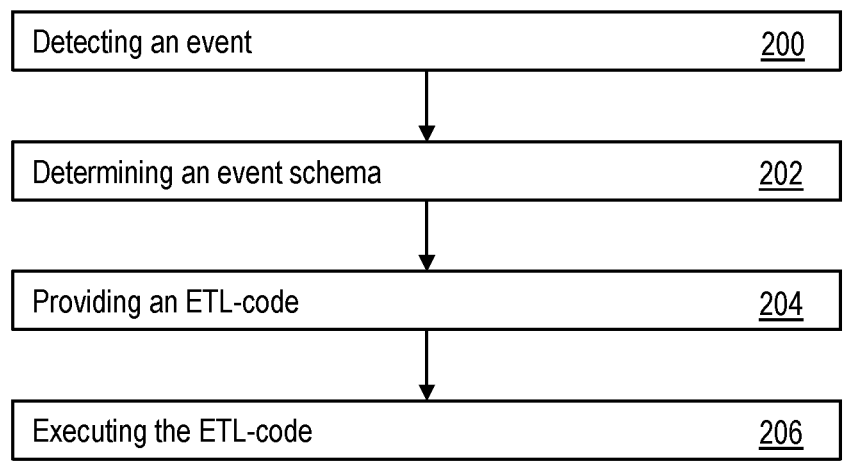
FIG. 7 depicts a schematic flow diagram of an exemplary method for extracting data from a blockchain by an ETL-device.

FIG. 7 depicts a schematic flow diagram of an exemplary method for extracting data from a blockchain by an ETL-device. The ETL-device may, e.g., be implemented as an ETL-peer comprising the blockchain network providing the blockchain. In block 200, an event is detected by the ETL-device. For detecting the event an event detector of a runtime source extractor of the ETL-device may be used. In block 202, an event schema is determined by the ETL-device for the detected event. For the determining, a schema selector of the runtime source extractor may be used as well as one or more libraries providing event schemas. The determined event schema identifies a logical structure of the event data representing the detected event. In block 204, an ETL-code for is provided by the ETL-device. The ETL-code comprises a set of machine-executable instructions configured for extracting the event data of the detected event from a block of the blockchain provided by the blockchain network. The ETL-code may further be configured for transforming the extracted event data using the determine event schema to comply with a data model defining a logical structure of an external data structure, e.g., an off-chain database, the data content of which is to be modified using the extracted event data, as well as for loading the transformed data to the external data structure to modify the data content of the external data structure. The providing of the ETL-code may comprise a mapping the event data to the logical structure of the external data structure using a mapping creator of the ETL-device. For the mapping the determined event schema as well as the data model of the external data structure may be used. Furthermore, the providing of the ETL-code may comprise a generating of the ETL-code for the event using the mapping. In block 206, the provided ETL-code is executed by the ETL-device. The ETL-device may use a code executor of a runtime source-to-target-transformer for executing the ETL-code. The execution of the ETL-code causes the ETL-device to extract the event data representing the detected event from the block of blockchain, to transform the extracted event data using the event schema to comply with the data model of the external data structure, and to load the transformed event data to the external data structure to modify the data content of the external data structure according to the detected event. The loading of the transformed event data may comprise a messaging of the transformed event data by the ETL-device via a messaging network to an external computational device external of the blockchain network. The external computational device may manage the external data structure.

Figure 8:
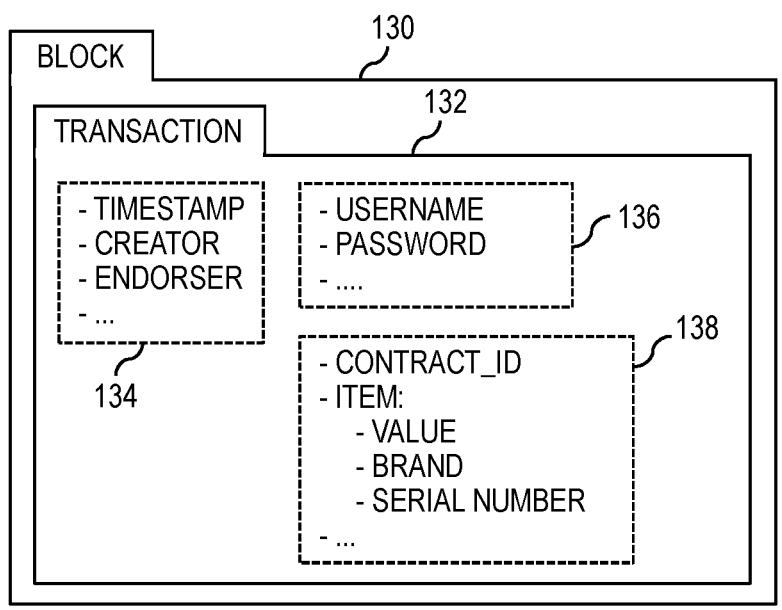
FIG. 8 depicts a schematic diagram illustrating an exemplary block of a blockchain comprising event data.

FIG. 8 depicts a schematic diagram illustrating an exemplary block 130 of a blockchain comprising a transaction 132 with event data including metadata 134, user assets 136, and/or contract asset 138. The transaction represents a purchasing of an insurance by a user. For this purpose, the transaction writes two additional assets, i.e., an additional user asset 136 and an additional contract asset 138. The user asset 136 may comprise user related data, like a username, a password, etc. The contract asset 138 comprises information about the insurance contract, e.g., a contract ID, as well as additional information regarding an item of concern, e.g., a value, a brand a serial number, etc. In addition, the transaction 132 may comprise metadata 134, e.g., providing a timestamp of the transaction, identifying a creator of the transaction 132, identifying an endorser of the transaction 132, etc.

Figure 9:
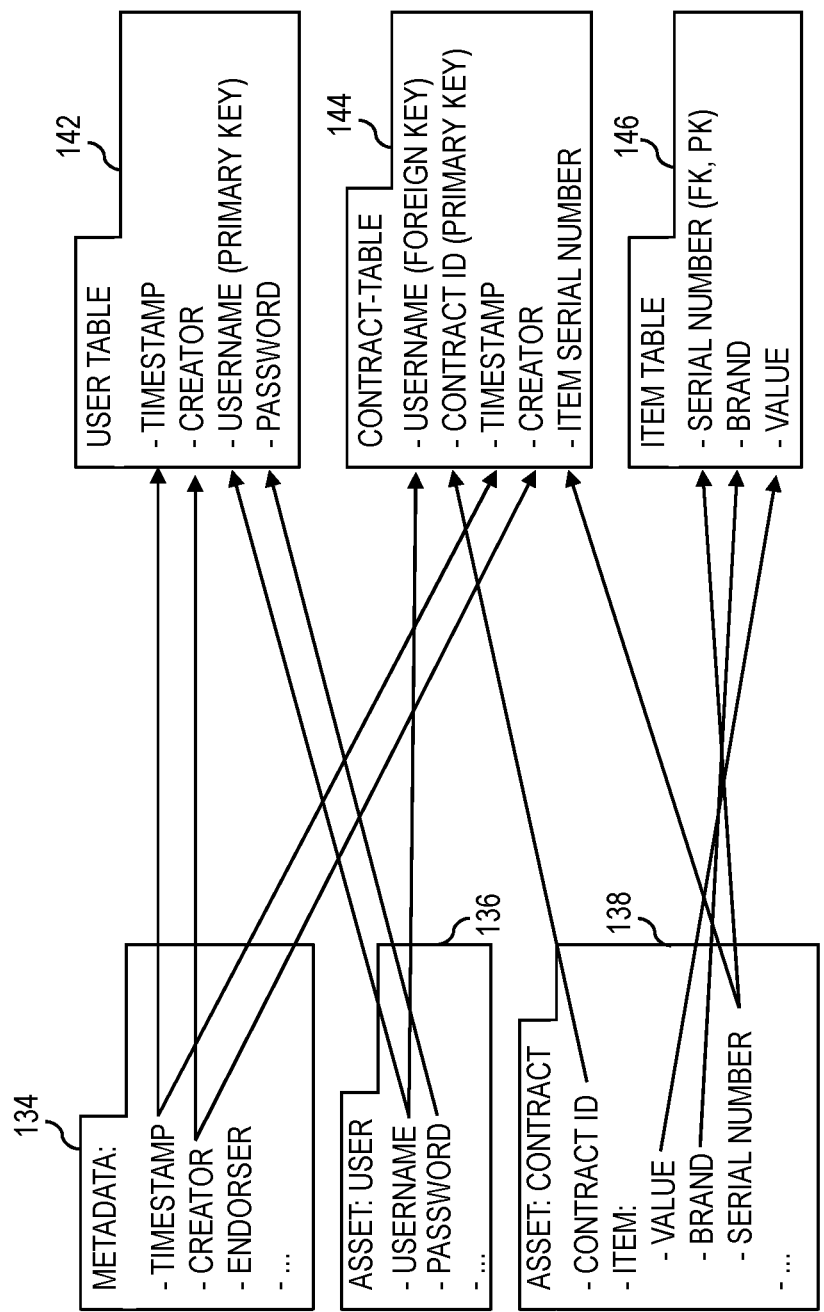
FIG. 9 depicts a schematic diagram illustrating an exemplary mapping of event data of a block of a blockchain to an external data structure.

FIG. 9 depicts a schematic diagram illustrating an exemplary mapping of event data of block 130 of FIG. 8 to an external data structure provided in form of a plurality of tables including user table 142, contract table 144, and item table 146 defined according to a relational data model. A user table 142 may comprise user related information, like the timestamp and a creator ID from the metadata 134 as well as a username as a primary key and a password from the user asset 136. A contract table 144 may comprise contract related information, like the username as a foreign key from the user asset 136, the contract ID as a primary key and an item serial number from the contract asset 138, and the timestamp as well as the creator ID from the metadata 134. Finally, an item table 146 may comprise a serial number of the item as a foreign or a primary key, a brand and a value from the contract asset 138.

Figure 10:
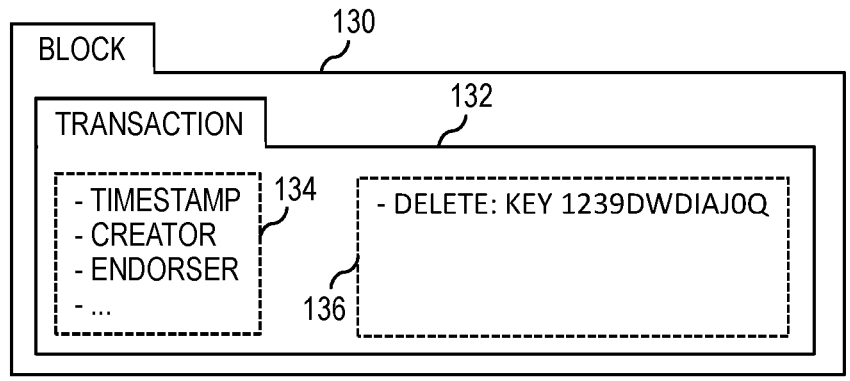
FIG. 10 depicts a schematic diagram illustrating an exemplary block of a blockchain comprising event data.

FIG. 10 depicts a schematic diagram illustrating a further exemplary block 130 of a blockchain with a transaction 132 comprising event data including metadata 134, user asset 136. Besides the metadata 134, e.g., a timestamp, a creator ID, an endorser ID, etc., the event data may comprise a data delete identifying key "1239DWDIAJOQ" to be deleted. In order to be able, the execute this delete also on the external data structure, the ETL-device may be required to identify the actual data value referred to by the key "1239DWDIA-JOQ". For identifying the respective data value, the ETL-device may use a callback function targeting a local data collection before executing the data delete on the local data collection or the ETL-device may search the blockchain for the most recent assignment of key "1239DWDIAJOQ". After having identified the actual data value referred to by the key "1239DWDIAJOQ", the ETL-device may generate a delete request identifying the data elements to be deleted from the data content of the external data structure, in order to modify the data content in accordance with the data delete defined by the transaction 132.

Figure 11:
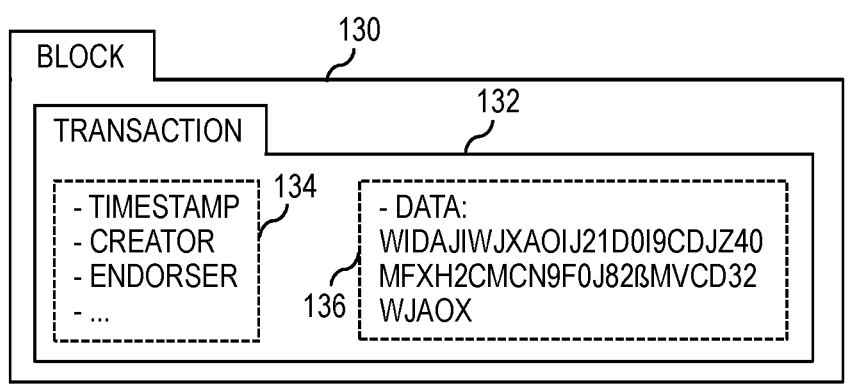
FIG. 11 depicts a schematic diagram illustrating an exemplary block of a blockchain comprising event data.

FIG. 11 depicts a schematic diagram illustrating an exemplary block 130 of a of a blockchain with a transaction 132 comprising event data including metadata 134 and user asset 136. Besides the metadata 134, e.g., a timestamp, a creator ID, an endorser ID, etc., the event data may comprise a data hash value ("WIDAJIWJXAOIJ21D0I9CDJZ40MF XH2CMCN9F0J82βMVCD32WJAOX") defining a data element added to a private data collection. In order to prevent unauthorized access to the respective data element by entities having access rights to access the blockchain, but no access rights to access the respective data element, only a hash value is recorded in the transaction 132. Thus, each entity with access to a copy of the respective private data collection is enabled to determine actual value of the respective data element, while all other entities are prevented from accessing the respective data element. The actual data element may be routed via a secure channel between entities, like the ETL-device, with access to a copy of the private data collection. In order to be able to extract the respective data element, the ETL-device may use the data hash value to identify the data element and may extract the same from the private data collection in order to provide it too the external data structure.

It is understood that one or more of the aforementioned embodiments of the invention may be combined as long as the combined embodiments are not mutually exclusive.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Possible combinations of features described above may be the following:

1. A method for a model-driven extraction of event data representing an event occurring on a blockchain network by a computational device with access to the blockchain network, wherein the computational device is configured as an ETL-device for executing an ETL-code to modify a data content of an external data structure external of the blockchain network using the extracted event data, the method comprising:

detecting the event occurring on the blockchain network,
　determining an event schema for the detected event, wherein the event schema identifies a logical structure of the event data representing the detected event,
　providing the ETL-code, wherein the ETL-code comprises a set of machine-executable instructions configured for extracting the event data representing the detected event, transforming the extracted event data using the event schema to comply with a data model defining a logical structure of the external data structure and loading the transformed data to the external data structure to modify the data content of the external data structure,
　executing the provided ETL-code, wherein the execution of the ETL-code causes the ETL-device to:
　　extract the event data representing the detected event,
　　transform the extracted event data using the event schema to comply with the data model of the external data structure,
　　load the transformed event data to the external data structure to modify the data content of the external data structure.

2. The method of item 1, wherein the loading of the transformed event data comprises messaging the transformed event data by the ETL-device via a messaging network to an external computational device external of the blockchain network, wherein the external computational device manages the external data structure.

3. The method of any of the preceding items, wherein the providing of the ETL-code comprises:
　mapping the event data to the logical structure of the external data structure, wherein for the mapping the determined event schema as well as the data model of the external data structure are used,
　generating the ETL-code for the event using the mapping.

4. The method of any of the preceding items, wherein the ETL-device is comprising the blockchain network in form of an ETL-peer.

5. The method of any of items 1 to 3, wherein the ETL-device is an external computational device configured to monitor data exchanged on the blockchain network using a cryptographically secured messaging connection to a peer of the blockchain network.

6. The method of item 4, wherein the detecting of the event comprises a direct event capturing by detecting event data being provided by the ETL-peer to be added to the blockchain as part of a block of the blockchain.

7. The method of item 4, wherein the detecting of the event comprises monitoring data being routed on the blockchain network via the ETL-peer using a communication protocol of the blockchain network.

8. The method of any of the preceding items, wherein the event schema is determined using a library providing one or more event schemas identifying logical structures of event data representing types of events potentially occurring on the blockchain network.

9. The method of item 8, wherein, in case none of the event schemas provided by the library matches the logical structure of the event data of the detected event, the method further comprises:
　analyzing the logical structure of the event data of the detected event,
　determining an additional event schema matching the logical structure of the event data of the detected event,
　adding the additional event schema to the library.

10. The method of any of the preceding items, wherein the determining of the event schema comprises tagging one or more data elements comprising the event data using the determined event schema, wherein the tags identify structural types of data elements defined by the determined event schema.

11. The method of item 10, wherein the tags are used for mapping tagged data elements to structural elements defined by the logical structure of the external data structure.

12. The method of any of the preceding items, wherein the external data structure is provided in form of a database and a database management system for managing the database using the data model.

13. The method of item 12, wherein the data model used by the database management system for managing the database is one of the following data models: a relational data model, a hierarchical data model, a network data model, an object-oriented data model, a graph data model, an entity-relationship model data model, a key value data model, a multidimensional data model, a column-oriented data model, a document oriented data model and a data stream data model.

14. The method of any of the preceding items, wherein the transforming of the extracted event data comprises adding one or more structural IDs according to the data model to the extracted event data.

15. The method of any of the preceding items, wherein the extracting of event data, in case the detected event comprises a data delete, further comprises executing a callback in order to retrieve additional data from the blockchain network and using the additional data to determine one or more data elements to be deleted from the external data structure in order to modify the data content of the external data structure in accordance with the data delete.

16. The method of item 15, wherein the callback targets the blockchain provided by the blockchain network or a local data collection provided by a peer of the blockchain network.

17. The method of any of the preceding items, wherein the event data is extracted from a block of the blockchain provided by the blockchain network.

18. The method of item 17, wherein the blockchain is a permissioned blockchain with restricted access to extract data from the blockchain, wherein the ETL-device is registered and comprises access rights enabling the ETL-device to extract data from the blockchain.

19. The method of any of items 17 to 18, wherein the blockchain comprises encrypted data, wherein the ETL-device has access to a decryption key, wherein the extracting of event data comprises decrypting the event data.

20. The method of any of items 17 to 19, wherein the extracting of event data further comprises retrieving additional event data from a local data collection provided by a peer of the blockchain network, wherein the additional event data is assigned to the event data extracted from the block of the blockchain.

21. The method of item 20, wherein the local data collection is a private data collection shared by a limited set of peers of the blockchain network and private data of the private data is routed collection using cryptographically secured communication connections restricted to use by the peers of the limited set of peers.

22. The method of any of the preceding items, wherein the loading comprises a write request using the transformed data.

23. The method of item 22, wherein the write request comprises a request for at least one of the following: updating a data element of the data content of the external data structure using the transformed data, deleting a data element of the data content of the external data structure identified by the transformed data, inserting an additional data element provided by the transformed data into the data content of the external data structure.

24. A computer program product comprising a non-volatile computer-readable storage medium having computer-readable program code embodied therewith for a model-driven extraction of event data representing an event occurring on a blockchain network by a computational device with access to the blockchain network, wherein the computational device is configured as an ETL-device for executing an ETL-code to modify a data content of an external data structure external of the blockchain network using the extracted event data, wherein an execution of the program code by a processor of the ETL-device causes the processor to control the ETL-device to:
  detect the event occurring on the blockchain network,
  determine an event schema for the detected event, wherein the event schema identifies a logical structure of the event data representing the detected event,
  provide the ETL-code, wherein the ETL-code comprises a set of machine-executable instructions configured for extracting the event data representing the detected event, transforming the extracted event data using the event schema to comply with a data model defining a logical structure of the external data structure and loading the transformed data to the external data structure to modify the data content of the external data structure,
  execute the provided ETL-code, wherein the execution of the ETL-code causes the ETL-device to:
    extract the event data representing the detected event,
    transform the extracted event data using the event schema to comply with the data model of the external data structure,
    load the transformed event data to the external data structure to modify the data content of the external data structure.

25. A computational device with access to a blockchain network for a model-driven extraction of event data representing an event occurring on the blockchain network, wherein the computational device is configured as an ETL-device for executing an ETL-code to modify a data content of an external data structure external of the blockchain network using the extracted event data,
  wherein the ETL-device comprises a processor and a memory storing machine-executable program instructions, wherein executing the program instructions by the processor causes the processor to control the ETL-device to:
    detect the event occurring on the blockchain network,
    determine an event schema for the detected event, wherein the event schema identifies a logical structure of the event data representing the detected event,
    provide the ETL-code, wherein the ETL-code comprises a set of machine-executable instructions configured for extracting the event data representing the detected event, transforming the extracted event data using the event schema to comply with a data model defining a logical structure of the external data structure and loading the transformed data to the external data structure to modify the data content of the external data structure,
    execute the provided ETL-code, wherein the execution of the ETL-code causes the ETL-device to:
      extract the event data representing the detected event,
      transform the extracted event data using the event schema to comply with the data model of the external data structure,
      load the transformed event data to the external data structure to modify the data content of the external data structure.

The invention claimed is:

1. A method for performing a model-driven extraction of event data representing an event occurring on a blockchain network by a computational device with access to the blockchain network, the method comprising:
   detecting the event occurring on the blockchain network;
   determining an event schema for the detected event;
   extracting the event data representing the detected event;
   transforming the extracted event data using the event schema to comply with a data model of an external data structure;
   mapping, based on the determined event schema and the data model, the event data to a logical structure of the external data structure; and
   loading the transformed event data to the external data structure to modify a data content of the external data structure based on the mapping.

2. The method of claim 1, further comprising:
   messaging the transformed event data by the computational device via a messaging network to an external computational device external to the blockchain network, wherein the external computational device manages the external data structure.

3. The method of claim 1, further comprising:
   mapping, based on the determined event schema and the data model of the external data structure, the event data to the logical structure of the external data structure; and
   generating ETL-code for the event using the mapping.

4. The method of claim 1 wherein the computational device is inside the blockchain network in the form of an ETL-peer.

5. The method of claim 1, wherein the computational device is an external computational device configured to monitor data exchanged on the blockchain network using a cryptographically secured messaging connection to a peer of the blockchain network.

6. The method of claim 4, wherein detecting the event occurring on the blockchain network comprises:
   detecting event data being provided by the ETL-peer to be added to a blockchain as part of a block of the blockchain.

7. The method of claim 4, wherein detecting the event occurring on the blockchain network comprises:
   monitoring data being routed on the blockchain network via the ETL-peer using a communication protocol of the blockchain network.

8. The method of claim 1, wherein the event schema is determined using a library providing one or more event schemas identifying logical structures of event data representing one or more types of events potentially occurring on the blockchain network.

9. The method of claim 8, further comprising:
   responsive to determining that none of the event schemas provided by the library match the logical structure of the event data of the detected event, analyzing the logical structure of the event data of the detected event;
   determining an additional event schema matching the logical structure of the event data of the detected event; and
   adding the additional event schema to the library.

10. The method of claim 1, wherein determining the event schema comprises:
    tagging one or more data elements comprising the event data using the determined event schema, wherein tags identify one or more structural types of data elements defined by the determined event schema.

11. The method of claim 10, wherein the tags map tagged data elements to one or more structural elements defined by the logical structure of the external data structure.

12. The method of claim 1, wherein the external data structure is provided in the form of a database and a database management system for managing the database using the data model.

13. The method of claim 12, wherein the data model used by the database management system for managing the database is selected from a list consisting of:
    a relational data model, a hierarchical data model, a network data model, an object-oriented data model, a graph data model, an entity-relationship model data model, a key value data model, a multidimensional data model, a column-oriented data model, a document oriented data model, and a data stream data model.

14. The method of claim 1, wherein the transforming of the extracted event data comprises:
    adding one or more structural IDs according to the data model to the extracted event data.

15. The method of claim 1, further comprising:
    responsive to determining that the detected event comprises a data delete, executing a callback to retrieve a plurality of additional data from the blockchain network;
    identifying, based on the additional data, one or more data elements to be deleted from the external data structure to modify the data content of the external data structure in accordance with the data delete.

16. The method of claim 15, wherein the callback targets a blockchain provided by the blockchain network or a local data collection provided by a peer of the blockchain network.

17. The method of claim 1, wherein the event data is extracted from a block of a blockchain provided by the blockchain network.

18. The method of claim 17, wherein the blockchain is a permissioned blockchain with restricted access to extract data from the blockchain, wherein the computational device is registered and comprises access rights enabling the computational device to extract data from the blockchain.

19. The method of claim 17, wherein the blockchain comprises encrypted data, wherein the computational device has access to a decryption key, and wherein the extracting of event data comprises decrypting the event data.

20. The method of claim 17, wherein extracting the event data further comprises:
    retrieving a plurality of additional event data from a local data collection provided by a peer of the blockchain network, wherein the additional event data is assigned to the event data extracted from the block of the blockchain.

21. The method of claim 20, wherein the local data collection is a private data collection shared by a limited set of peers of the blockchain network, and wherein private data of the private data collection is routed using cryptographically secured communication connections restricted to use by one or more peers of the limited set of peers.

22. The method of claim 1, wherein the loading comprises a write request using the transformed event data.

23. The method of claim 22, wherein the write request comprises a request selected from a list consisting of:
    updating a data element of the data content of the external data structure using the transformed data, deleting a data element of the data content of the external data structure identified by the transformed data, inserting an additional data element provided by the transformed data into the data content of the external data structure.

24. A computer program product comprising a non-volatile computer-readable storage medium having computer-readable program code embodied therewith for a model-driven extraction of event data representing an event occurring on a blockchain network by a computational device with access to the blockchain network, the computer-readable program code executable by a processor to cause the processor to perform a method comprising the steps of:
   detecting the event occurring on the blockchain network;
   determining an event schema for the detected event;
   extracting the event data representing the detected event;
   transforming the extracted event data using the event schema to comply with a data model of an external data structure;
   mapping, based on the determined event schema and the data model, the event data to a logical structure of the external data structure; and
   loading the transformed event data to the external data structure to modify a data content of the external data structure based on the mapping.

25. A computer system for performing a model-driven extraction of event data representing an event occurring on the blockchain network, the computer system comprising: one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   detecting the event occurring on the blockchain network;
   determining an event schema for the detected event;
   extracting the event data representing the detected event;
   transforming the extracted event data using the event schema to comply with a data model of an external data structure;
   mapping, based on the determined event schema and the data model, the event data to a logical structure of the external data structure; and
   loading the transformed event data to the external data structure to modify a data content of the external data structure based on the mapping.

* * * * *